United States Patent
Chen

(10) Patent No.: US 12,541,504 B2
(45) Date of Patent: Feb. 3, 2026

(54) DATA PROCESSING METHOD, SYSTEM, AND APPARATUS, DEVICE, AND STORAGE MEDIUM

(71) Applicant: Tencent Technology (Shenzhen) Company Limited, Shenzhen (CN)

(72) Inventor: Zimin Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/742,271

(22) Filed: Jun. 13, 2024

(65) Prior Publication Data

US 2024/0330275 A1 Oct. 3, 2024

Related U.S. Application Data

(63) Continuation of application No. PCT/CN2023/091982, filed on May 4, 2023.

(30) Foreign Application Priority Data

Jun. 30, 2022 (CN) .......................... 202210770957.9

(51) Int. Cl.
*G06F 16/23* (2019.01)
(52) U.S. Cl.
CPC .............................. *G06F 16/2379* (2019.01)
(58) Field of Classification Search
CPC ... G06F 16/2379; G06F 9/50; H04L 63/0428; H04L 63/123; H04L 9/40; H04L 9/32; Y02D 10/00
See application file for complete search history.

(56) References Cited

U.S. PATENT DOCUMENTS

| 12,231,559 B2* | 2/2025 | Dods et al. ........... H04L 9/0822 |
| 2020/0028688 A1* | 1/2020 | Takada ................. H04L 9/3247 |
| 2021/0209091 A1 | 7/2021 | Jing |
| 2021/0328791 A1 | 10/2021 | Wei et al. |

(Continued)

FOREIGN PATENT DOCUMENTS

| CN | 111401903 A | 7/2020 |
| CN | 111541785 A | 8/2020 |

(Continued)

OTHER PUBLICATIONS

Jul. 15, 2023—(WO) Search Report—App PCT/CN2023/091982.
Jun. 14, 2025—CN First Office Action—App No. 202210770957.9.
Apr. 23, 2025—EP Extended Search Report—App No. 23829693.3.

*Primary Examiner* — Neveen Abel Jalil
(74) *Attorney, Agent, or Firm* — Banner & Witcoff, Ltd.

(57) ABSTRACT

A data processing method, system, and apparatus, a device, and a storage medium are provided and relate to the field of computer technologies. The method is performed by a node device that is in a blockchain system and in which a smart contract is stored and includes: obtaining to-be-processed data, and generating a data processing request if a processing manner of the data belongs to an off-chain processing manner; sending the data processing request to the computer device outside the blockchain system through the smart contract; receiving a data processing result returned by the computer device; and performing a consensus on the data processing result, to obtain a first consensus processing result.

14 Claims, 10 Drawing Sheets

(56) References Cited

U.S. PATENT DOCUMENTS

| | | | |
|---|---|---|---|
| 2021/0357387 A1* | 11/2021 | Lee | G06F 16/258 |
| 2022/0094543 A1* | 3/2022 | Sekar | H04L 9/50 |
| 2022/0239508 A1 | 7/2022 | Liu | |
| 2022/0247818 A1* | 8/2022 | Ragothaman | H04L 67/1095 |
| 2022/0271958 A1* | 8/2022 | Bassili | H04L 9/321 |
| 2023/0362010 A1* | 11/2023 | Reeve et al. | H04L 9/3236 |

FOREIGN PATENT DOCUMENTS

| | | |
|---|---|---|
| CN | 112241884 A | 1/2021 |
| CN | 113438289 A | 9/2021 |
| CN | 114240657 A | 3/2022 |

\* cited by examiner

DATA PROCESSING METHOD, SYSTEM, AND APPARATUS, DEVICE, AND STORAGE MEDIUM

RELATED APPLICATION

This application claims priority to Chinese Patent Application No. 202210770957.9, filed on Jun. 30, 2022 and entitled "DATA PROCESSING METHOD, SYSTEM, AND APPARATUS, DEVICE, AND STORAGE MEDIUM", and is a continuation of PCT Application No. PCT/CN2023/091982, Filed May 4, 2023, each of which is incorporated herein by reference in its entirety.

FIELD OF THE TECHNOLOGY

This application relates to the field of computer technologies, and in particular, to a data processing method, system, and apparatus, a device, and a storage medium.

BACKGROUND

With rapid development of blockchain technologies, the blockchain technologies are widely applied to various services. A node device in a blockchain system can perform processing, for example, hash computation, signature verification, and key verification on data in the blockchain system.

SUMMARY

Aspects of the disclosure provide a data processing method, system, and apparatus, a device, and a storage medium.

According to an aspect, a data processing method is provided, performed by any node device in a blockchain system, a smart contract being stored in the node device; and the method including: obtaining target data, and generating a data processing request corresponding to the target data if a processing manner corresponding to the target data belongs to an off-chain processing manner, the off-chain processing manner referring to a computer device outside the blockchain system performing processing; sending the data processing request to the computer device outside the blockchain system through the smart contract, the smart contract being provided with an interface configured for performing interaction with the computer device outside the blockchain system, and the computer device being provided with a processing resource configured for processing the data for the smart contract; receiving a data processing result obtained by the computer device based on the data processing request; and performing a consensus procedure on the data processing result, to obtain a first consensus processing result.

According to another aspect, a data processing method is provided, performed by any computer device outside a blockchain system, the method including: receiving a data processing request that corresponds to target data and that is sent by a target node device through a smart contract, the target node device being any one of a plurality of node devices in the blockchain system, the smart contract being provided with an interface configured for performing interaction with the computer device outside the blockchain system, the computer device being provided with a processing resource configured for processing the data for the smart contract, the data processing request being generated by the target node device if a processing manner corresponding to the target data belongs to an off-chain processing manner, and the off-chain processing manner referring to the computer device outside the blockchain system performing processing; determining a data processing result in response to the data processing request; and sending the data processing result to the target node device, the target node device being configured to receive the data processing result sent by the computer device and perform a consensus procedure on the data processing result, to obtain a first consensus processing result.

According to another aspect, a data processing system is provided, the data processing system including a plurality of node devices in a blockchain system and a computer device outside the blockchain system, a smart contract being stored in the node devices, the smart contract being provided with an interface configured for performing interaction with the computer device outside the blockchain system, and the computer device being provided with a processing resource configured for processing data for the smart contract; a target node device in the plurality of node devices being configured to obtain target data, and generate a data processing request corresponding to the target data if a processing manner corresponding to the target data belongs to an off-chain processing manner, the off-chain processing manner referring to a computer device outside the blockchain system performing processing; the target node device being further configured to send the data processing request to the computer device through the smart contract; the computer device being configured to determine data processing result in response to the data processing request and return the data processing result to the target node device; the target node device being further configured to receive the data processing result returned by the computer device; and the target node device being further configured to perform a consensus procedure on the data processing result, to obtain a first consensus processing result.

According to another aspect, a data processing apparatus is provided, applied to any node device in a blockchain system, a smart contract being stored in the node device; and the apparatus including: a request transmitting module, configured to obtain target data, and generate a data processing request corresponding to the target data if a processing manner corresponding to the target data belongs to an off-chain processing manner, the off-chain processing manner referring to a computer device outside the blockchain system performing processing; the request transmitting module being further configured to send the data processing request to the computer device outside the blockchain system through the smart contract, the smart contract being provided with an interface configured for performing interaction with the computer device outside the blockchain system, and the computer device being provided with a processing resource configured for processing the data for the smart contract; a result receiving module, configured to receive a data processing result obtained by the computer device based on the data processing request; and a consensus module, configured to perform a consensus procedure on the data processing result, to obtain a first consensus processing result.

According to another aspect, a data processing apparatus is provided, applied to any computer device outside a blockchain system, the apparatus including: a request receiving module, configured to receive a data processing request that corresponds to target data and that is sent by a target node device through a smart contract, the target node device being any one of a plurality of node devices in the blockchain system, the smart contract being provided with an interface configured for performing interaction with the computer device outside the blockchain system, the computer device being provided with a processing resource configured for processing the data for the smart contract, the data processing request being generated by the target node device if a processing manner corresponding to the target data belongs to an off-chain processing manner, and the off-chain processing manner referring to the computer device outside the blockchain system performing processing; a processing module, configured to determine a data processing result in response to the data processing request; and a result transmitting module, configured to send the data processing result to the target node device, the target node device being configured to receive the data processing result sent by the computer device and perform a consensus procedure on the data processing result, to obtain a first consensus processing result.

According to another aspect, a computer device is provided, the computer device including a processor and a memory, at least one computer program being stored in the memory, and the at least one computer program being loaded and executed by the processor, to implement the data processing method according to any one of the foregoing aspects.

According to another aspect, a computer-readable storage medium is provided, at least one computer program being stored in the computer-readable storage medium, and the at least one computer program being loaded and executed by a processor, to implement the data processing method according to any one of the foregoing aspects.

According to another aspect, a computer program product is provided, including a computer program, the computer program being loaded and executed by a processor, to implement the data processing method according to any one of the foregoing aspects.

DETAILED DESCRIPTION

Figure 1:
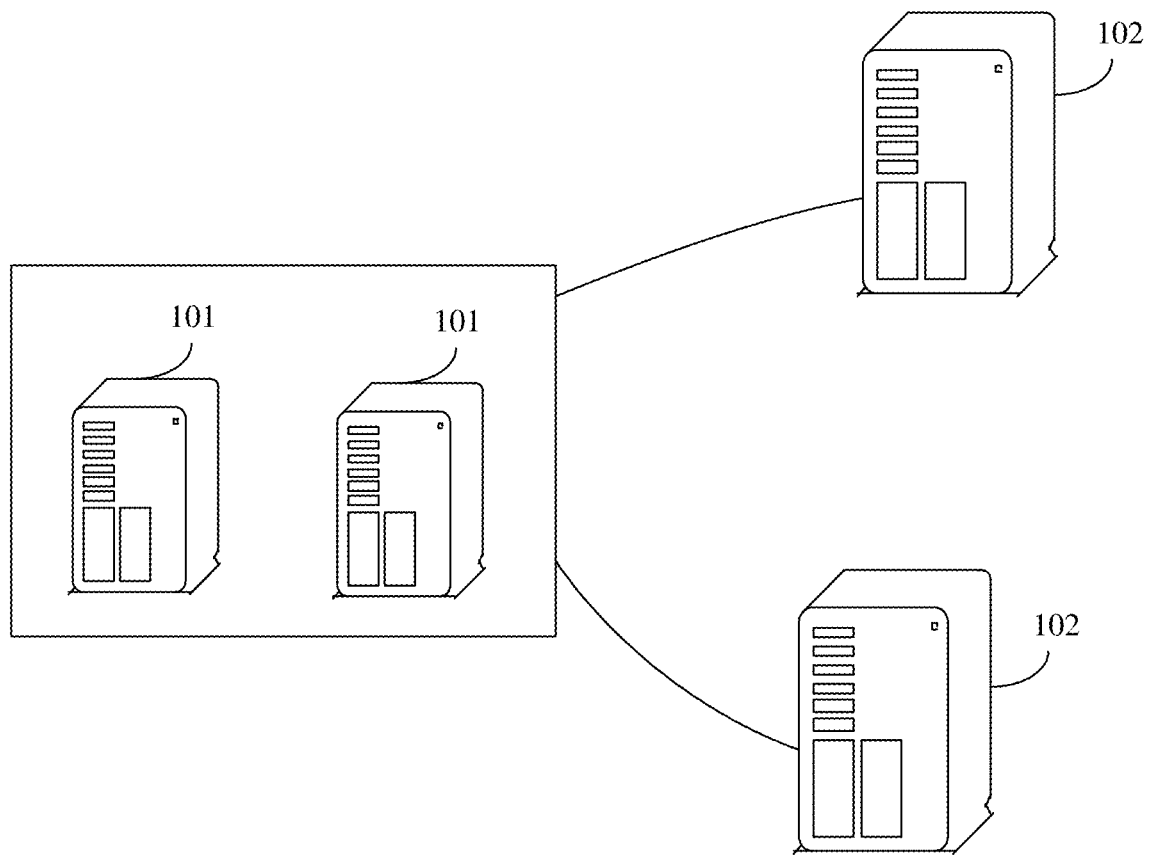
FIG. 1 is a schematic diagram of an implementation environment of a data processing method according to one or more aspects described herein.

The terms "first", "second", and the like used herein may be used for describing various concepts. However, the concepts are not limited by the terms unless otherwise specified. The terms are merely used for distinguishing one concept from another concept. For example, a first prediction result may be referred to as a second prediction result, and similarly, the second prediction result may be referred to as the first prediction result.

At least one may refer to one or more. For example, at least one node device refers to node devices in any integer quantity greater than or equal to one, for example, one node device, two node devices, or three node devices. A plurality of may refer to two or more. For example, a plurality of node devices may refer to node devices in any integer quantity greater than or equal to two, for example, two node devices or three node devices. Each may refer to each of at least one. For example, each node device may refer to each of a plurality of node devices. If a plurality of node devices are three node devices, each node device may refer to each of the three node devices.

According to aspects described herein, related data such as user information may be involved. In various applications, permission or consent of a user might need to be obtained, and collection, use, and processing of the related data need obey related laws, regulations, and standards of related nations and districts.

A node device in a blockchain system can perform processing including, for example, hash computation, signature verification, and key verification on data in the blockchain system. However, because the blockchain system may bear a large quantity of data processing tasks, data processing pressure is large, and data processing efficiency may be low.

For case of understanding, the following related terms are explained first:

1. Blockchain: A novel application mode of computer technologies such as distributed data storage, peer to peer transmission, a consensus mechanism, and an encryption algorithm. The blockchain generally refers to a decentralized database and is a string of data blocks generated through association by using a cryptographic method. Each data block includes information of a network transaction, the information being configured for verifying the validity of information of the data block (anti-counterfeiting) and generating a next block, and each block including a timestamp and a link to a previous block. In some instances, a blockchain is a chain data structure formed by combining data blocks according to a time sequence in a sequential connection manner, and a non-tamperable and unforgeable distributed ledger ensured in a cryptography manner. For example, once data in the blockchain is recorded, the data may be irreversible.

2. Smart contract: A contract defined in a binary format, and that may be automatically executed according to clauses of the contract. In the field of blockchain technologies, the smart contract may refer to a tamper-proofing and automatically executed computer program triggered by a pre-defined event. Therefore, the smart contract may also be considered as a computer protocol aiming to propagate, verify, or execute a contract in an informatization manner. A contract program automatically executed by each node in a blockchain system according to a particular condition may perform an operation on data stored on a chain, and may be an important path through which a user interacts with a blockchain and implements service logic by using the blockchain. The smart contract may aim to provide a secure method superior to a conventional contract and reduce other transaction costs related to the contract. The smart contract may permit trusted transactions to be performed without a third party, and these transactions may be traceable and irreversible.

Further, program code and a processing result of smart contract may be stored in a node device of the blockchain system in the form of contract data, and the contract data may refer to data for describing dynamic processing logic of a transaction. The contract data mentioned herein may include both executable code of the processing logic and an execution result of the processing logic. A contract, also referred to as a smart contract, may be a group of commitments defined in the form of computer code, and parties of the contract may be forced to execute the commitments. A contract may also be a protocol that participants can execute.

3. Oracle machine: A mechanism of writing data outside a blockchain into the blockchain, and can be mainly classified through the following aspects: (1) a source of a data source comes from software, hardware, or people; (2) flow direction of data: from a contract to the external world or from the external world to a contract; and (3) trust: a centralized oracle machine or a non-centralized oracle machine. Oracle machines can be classified into a plurality of types according to the foregoing types. For example, data of an oracle machine may come from an online website. According to the foregoing classification, the data of the oracle machine may come from software, the flow direction of the data of the oracle machine may be from the external world to the contract, and the oracle machine may be a centralized oracle machine.

1) Software oracle machine: The software oracle machine may obtain a data source through online software, and the data source may be a database, a service, a website, or network data. For example, real-time flight information may be obtained from a network.

2) Hardware oracle machine: The hardware oracle machine may obtain a data source through a hardware device, the data source may be an electronic sensor, an Internet of Things (IOT) device, a two-dimensional code, a robot, or another information reading device, and the hardware oracle machine may play a crucial role in "translating" information in the real world, so that the information can be understood by a smart contract.

3) Human oracle machine: Through persons with specific knowledge or skills, human oracle machines may be used as oracle machines, which can convert various information in the real world into formats that a smart contract can understand, and data sources may be the individuals with specific knowledge or skills. A human oracle machine can reply with some determinate data information, and can also reply with some indeterminate information, for example, "whether team A can defeat team B".

4) Computation oracle machine: The computation oracle machine may be used as an oracle machine through an off-chain specific computation program, a data source may be the off-chain specific computation program, and many resources may be consumed when some complicated computations are performed on the chain. Therefore, intensive computations may be shifted to an off-chain oracle machine, and an on-chain contract may obtain a running result of only the computation oracle machine.

5) Input or output oracle machine: The input oracle machine may convert data in the external world into a smart contract, and the input oracle machine may transfer data of the smart contract to the external world. For example, the input oracle machine may transfer an ambient temperature obtained by a sensor to a smart contract, and the output oracle machine may transfer an on-chain transaction verification result to an external machine to unfasten a smart lock.

6) Specific contract oracle machine: The specific contract oracle machine may be an oracle machine customized for a smart contract, a data source may be a specific oracle machine, and the oracle machine may serve only the smart contract, which can satisfy specific data requirements of different smart contracts.

7) Consensus oracle machine: The consensus oracle machine may obtain a data source through a plurality of parties, and the data source may be a result obtained after the plurality of parties reach a consensus. The consensus oracle machine may reduce the security risk by adding a participating party.

4. Sub-chain expansion solution: Blockchain expansion solutions on a blockchain may mainly include a centralized sub-chain expansion solution and a decentralized sub-chain expansion solution based on a zero-knowledge proof. In the centralized sub-chain expansion, a feasible third party may package a transaction proof on a sub-chain and submit the packaged transaction proof to a main chain (block header or the like). In the decentralized sub-chain expansion solution based on a zero-knowledge proof, a proof may be generated by performing a zero-knowledge proof algorithm in a process of running a transaction of a sub-chain, and may be submitted to a main chain for verification. If the verification succeeds, the transaction of the sub-chain may be anchored to the main chain, to implement a process of authenticating the transaction of the sub-chain by the main chain.

5. Consensus mechanism: A blockchain as a data structure for storing data in a time sequence may support different consensus mechanisms. A consensus mechanism is generally an important component of a blockchain technology, and may refer to a consensus protocol or a consensus algorithm adopted by a blockchain system. A consensus mechanism of the blockchain aims to enable all honest nodes to store consistent blockchain views, and may simultaneously satisfy two properties: A) consistency: prefix parts of blockchains stored in all honest nodes are completely the same; and B) validity: information published by an honest node is finally recorded by all other honest nodes in their own blockchains. When a blockchain system normally runs, some configuration information (or referred to as configuration data) may be required, where the configuration information usually includes a consensus protocol version number, a software version number, and configuration information of peer nodes of an underlying communication network.

FIG. 1 is a schematic diagram of an implementation environment of a data processing method according to aspects of the disclosure. Referring to FIG. 1, the implementation environment includes a plurality of node devices 101 (two node devices are used as an example in FIG. 1) in a blockchain system and a plurality of computer devices 102 (two computer devices are used as an example in FIG. 1) outside the blockchain system. For example, a computer device outside the blockchain system may be an oracle machine device. Any node device 101 in the blockchain system and any computer device 102 outside the blockchain system can perform one or more operations in the data processing method described herein.

A smart contract may be stored in each node device 101. The node device 101 may obtain to-be-processed target data through the smart contract, the target data referring to to-be-processed data; generate a data processing request for the target data if off-chain processing needs to be performed on the target data; and send the data processing request to at least one computer device 102 outside the blockchain system. Each computer device 102 may determine a data processing result in response to the data processing request, and return the data processing result to the smart contract in the node device 101. The node device 101 may then perform a consensus procedure on a plurality of received data processing results, to obtain a consensus processing result.

In one or more arrangements, the node device 101 or the computer device 102 may include a server. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. In one or more other arrangements, the node device 101 or the computer device 102 may be a terminal. The terminal may be a smartphone, a tablet computer, a laptop computer, a desktop computer, or the like.

Figure 2:
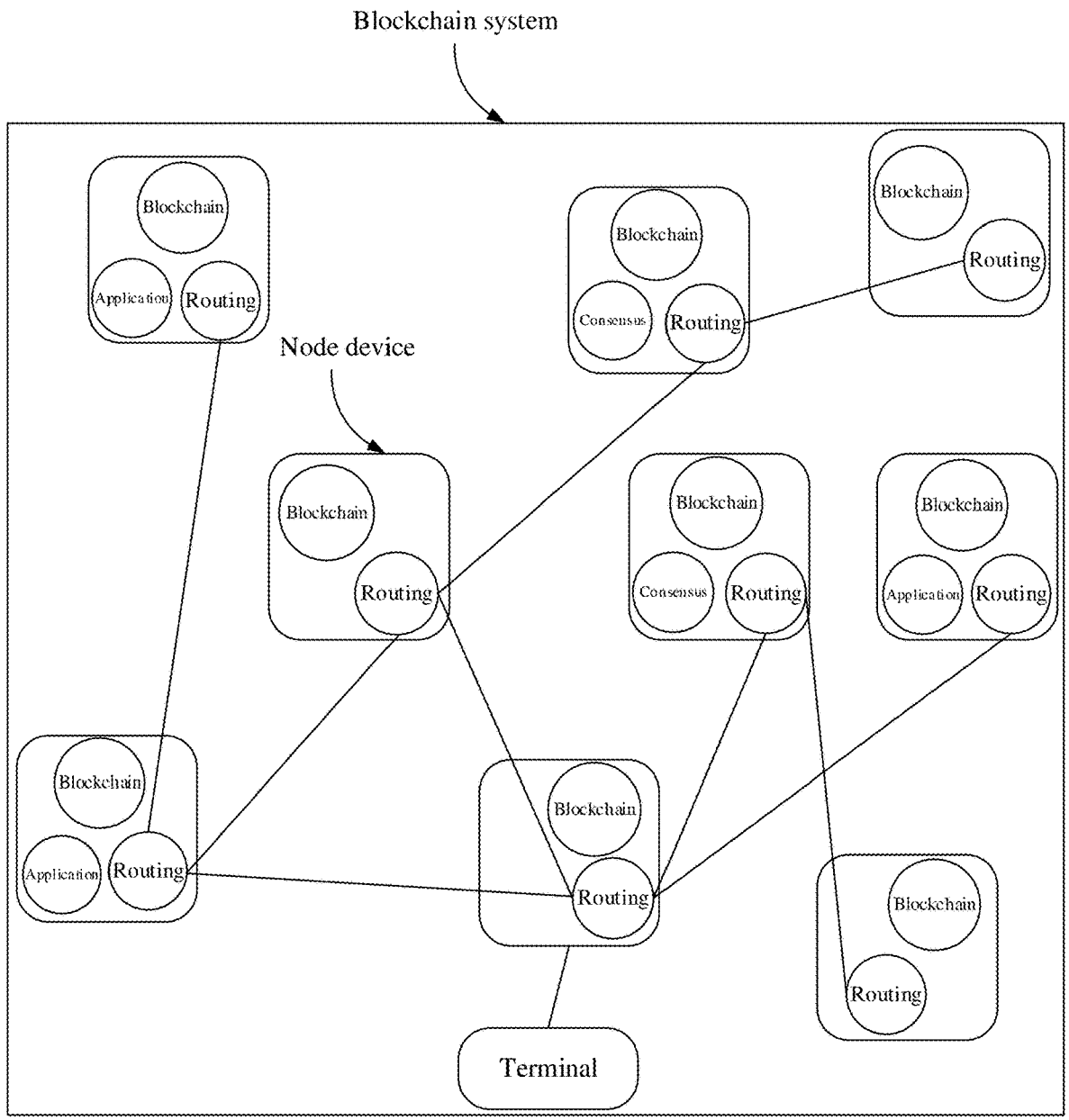
FIG. 2 is a schematic structural diagram of a blockchain system according to one or more aspects described herein.

FIG. 2 is a schematic structural diagram of a blockchain system according to one or more aspects described herein. The blockchain system may include a plurality of node devices and a terminal, and the terminal may be connected to a node device. A peer-to-peer (P2P) network may be formed between the node devices. The P2P protocol may be an application-layer protocol running over the Transmission Control Protocol (TCP). In the blockchain system, any computing device such as a server or a terminal can join and become a node device. Functions of each node device in the blockchain system may include the following: a) Routing: which may be a basic function of the node device, and may be used for supporting communication between node devices. In addition to the routing function, the node device further has the following functions: b) Application: which may be deployed in a blockchain, and may be used for implementing a particular service according to an actual service requirement, recording data related to function implementation to form recorded data, adding a digital signature to the recorded data to indicate a source of task data, and transmitting the recorded data to another node device in the blockchain system, so that the another node device adds the recorded data to a temporary block when successfully verifying a source and integrity of the recorded data.

Figure 3:
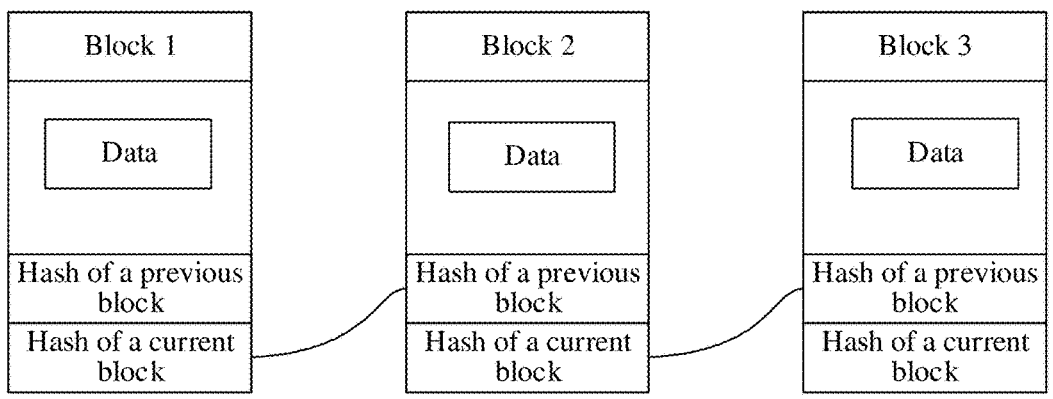
FIG. 3 is a schematic diagram of a block structure according to one or more aspects described herein.

FIG. 3 is a schematic diagram of a block structure according to one or more aspects described herein. Each block may include a hash value of a transaction record stored in the current block (a hash value of the current block) and a hash value of a previous block. Blocks may be connected according to hash values to form a blockchain. In addition, the block may further include information or data such as a timestamp indicating a block generation time.

The data processing method described herein may be applied to any scenario where data in a blockchain system needs to be processed. For example, one application may include scenarios where data is encrypted. After obtaining target data, a node device in the blockchain system may automatically trigger execution of a smart contract if the target data needs to be encrypted, and send an encryption request for the target data to a computer device outside the blockchain system in an execution process of the smart contract, and then the computer device may encrypt the target data, to obtain an encryption result, and return the encryption result to the node device. Therefore, if the node device can receive, in the execution process of the smart contract, the encryption result sent by the computer device, the node device may perform a consensus procedure on the received encryption result based on a consensus mechanism of the blockchain system, thereby obtaining a consensus encryption result, where the consensus encryption result may be used as an encryption result for the target data. In this scenario, the node device may transfer an encryption task in the blockchain system out of the blockchain, thereby reducing data processing pressure of the blockchain system, and the performing a consensus on the encryption result of the computer device through the node device can further ensure the accuracy and the confidence level of the final consensus encryption result.

Figure 4:
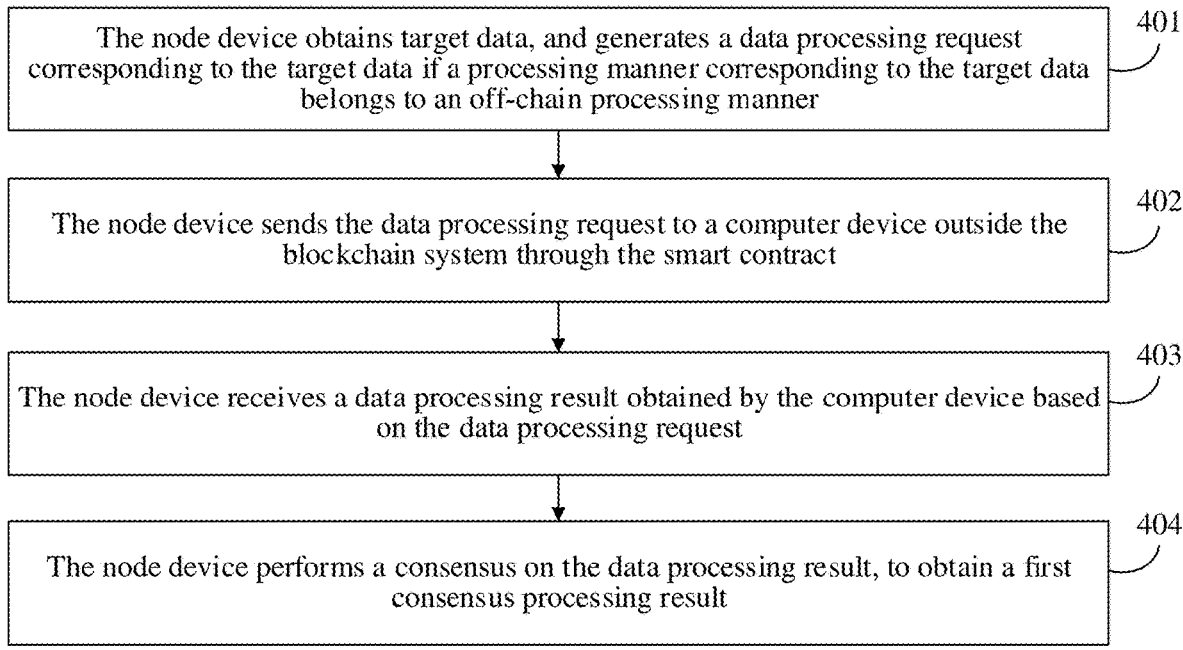
FIG. 4 is a flowchart of a data processing method according to one or more aspects described herein.

FIG. 4 is a flowchart of a data processing method according to one or more aspects described herein, is the processes of FIG. 4 may be performed by any node device in a blockchain system, and a smart contract may be stored in the node device. Referring to FIG. 4, the method includes:

401. The node device obtains target data, and generates a data processing request corresponding to the target data if a processing manner corresponding to the target data belongs to an off-chain processing manner.

The target data may refer to to-be-processed data, for example, data sent by another device to the node device, or data submitted by a user of the node device, or data generated when the smart contract performs processing according to service processing logic. After obtaining the target data, the node device may determine whether a processing manner corresponding to the target data belongs to an off-chain processing manner. The processing manner corresponding to the target data refers to a manner of processing the target data, and the off-chain processing manner may refer to a computer device outside the blockchain system performing the processing.

If the processing manner corresponding to the target data belongs to an off-chain processing manner, it may indicate that the computer device needs to be requested to process the target data. Therefore, the node device may generate a data processing request corresponding to the target data, where the data processing request includes the target data, and the data processing request may be configured for requesting processing of the target data.

In other words, after obtaining to-be-processed data, the node device may generate a data processing request for the data if a processing manner of the data belongs to an off-chain processing manner.

402. The node device sends the data processing request to a computer device outside the blockchain system through the smart contract.

The blockchain system may include a plurality of node devices, and the blockchain system may be a consortium blockchain system, a public blockchain system, a private blockchain system, or the like. In addition, a computer device may further exist outside the blockchain system, and the computer device might not belong to devices in the blockchain system. A smart contract may be stored in the node devices in the blockchain system, the smart contract may be provided with an interface configured for performing interaction with the computer device outside the blockchain system, that is, the smart contract interface may be configured to perform information exchange with the computer device in an execution process of the smart contract, and the computer device may be provided with a processing resource configured for processing data for the smart contract. For example, the smart contract may include an oracle machine smart contract, and a computer device outside the blockchain may be an oracle machine device. The oracle machine smart contract may be provided with an interface configured for performing interaction with the oracle machine device, that is, can perform information exchange with the oracle machine device in an execution process of the oracle machine smart contract, and the oracle machine device may be provided with a processing resource configured for processing data for the smart contract.

The node device may send the data processing request to the computer device outside the blockchain through the smart contract, to request the computer device to process the target data. In one example, the node device may broadcast the data processing request to the computer device outside the blockchain system, and the computer device outside the blockchain system may detect, periodically or in real time, the data processing request sent by the node device in the blockchain system.

In some arrangements, when the specific condition in operation 401 is satisfied, the node device may automatically trigger execution of the smart contract, generate the data processing request in an execution process of the smart contract, and send the data processing request to the computer device.

403. The node device receives a data processing result obtained by the computer device based on the data processing request.

After obtaining the data processing request sent by the node device, the computer device may perform processing based on the data processing request, to obtain a data processing result, and return the data processing result to the smart contract of the node device. Therefore, the node device can receive the data processing result of the computer device. In other words, the node device may receive the data processing result returned by the computer device based on the data processing request.

404. The node device performs a consensus on the data processing result, to obtain a first consensus processing result.

After obtaining the data processing result of the computer device, the node device may perform a consensus procedure on the data processing result based on a consensus mechanism of the blockchain system, to obtain a first consensus processing result. The consensus processing result may be used as a final processing result of the data processing request, and reliability of data processing is ensured by performing a consensus procedure on the data processing result provided outside the blockchain system.

In some arrangements, a consensus protocol version number adopted by the blockchain system can be queried through configuration data of the blockchain system, a consensus mechanism adopted by the blockchain system can be determined based on the consensus protocol version number, and then a consensus procedure may be performed on the data processing result based on the determined consensus mechanism, to obtain the first consensus processing result.

The consensus mechanism is generally an important component of the blockchain technology, as the consensus mechanism aims to enable all honest nodes in the blockchain system to store consistent consensus processing results. As such, the consensus mechanism typically needs to satisfy consistency and validity requirements, where consistency refers to prefix parts of blockchains stored in all honest nodes being the same or identical, and where validity refers to information published by a honest node (for example, the first consensus processing result in operation 404) being finally recorded by all other honest nodes in their own blockchains.

In some examples, types of consensus mechanisms include but are not limited to: proof of work (PoW), proof of stake (PoS), delegated proof of stake (DPoS), verification pool (Verify the Pooling), and the like. Types of consensus mechanisms are not limited herein.

According to one or more aspects, if off-chain processing needs to be performed on the target data, the node device in the blockchain system may request, through the smart contract, the computer device outside the blockchain system to process the data processing request of the target data, thereby transferring the data processing request from inside of the blockchain system to outside of the blockchain system for processing. This transfer may reduce data processing pressure of the blockchain system, and facilitate improvement in data processing efficiency. In addition, the node device may perform a consensus procedure on the data processing result obtained by performing processing by the computer device, to obtain a consensus processing result, thereby reducing risk of error and improving the accuracy and the confidence level of data processing.

Figure 5:
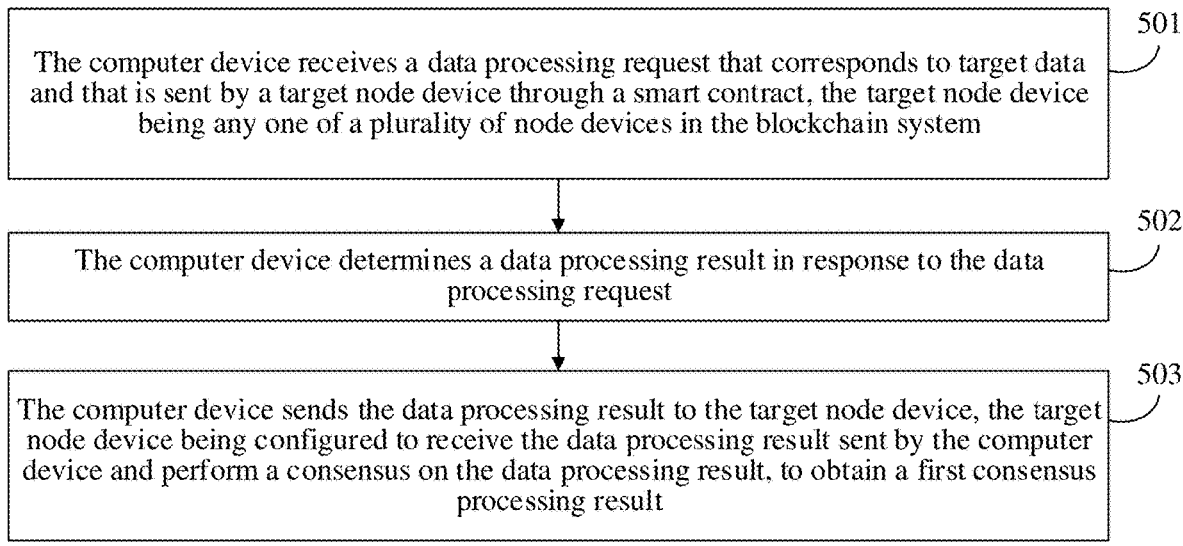
FIG. 5 is a flowchart of another data processing method according to one or more aspects described herein.

FIG. 5 is a flowchart of another data processing method according to one or more aspects. This method may be performed by any computer device outside a blockchain system. Referring to FIG. 5, the method includes:

501. The computer device receives a data processing request that corresponds to target data and that is sent by a target node device through a smart contract, the target node device being any one of a plurality of node devices in the blockchain system.

The data processing request may be generated by the target node device if a processing manner corresponding to the target data belongs to an off-chain processing manner, the off-chain processing manner referring to a computer device outside the blockchain system performing the processing. A smart contract may be stored in the node devices in the blockchain system, the smart contract may be provided with an interface configured for performing interaction with the computer device outside the blockchain system (e.g., for performing information exchange with the computer device in an execution process of the smart contract), and the computer device may be provided with a processing resource configured for processing data for the smart contract. The computer device outside the blockchain system may receive the data processing request sent by the target node device through the smart contract, and the data processing request may be configured for requesting the computer device to process the data. For a process in which the target node device sends the data processing request to the computer device through the smart contract, refer to the foregoing description of FIG. 4. The target node device may refer to any node device in the blockchain system.

In other words, the computer device may receive a data processing request for to-be-processed data sent by a node device in an execution process of a smart contract, the node device being located in the blockchain system, and the data processing request being generated by the node device if a processing manner of the data belongs to an off-chain processing manner.

In one example, a computer device may detect, periodically or in real time, a data processing request sent by each node device in the blockchain system. When the target node device broadcasts the data processing request to a plurality of computer devices, the computer devices can detect the data processing request.

502. The computer device determines a data processing result in response to the data processing request.

The data processing request may include target data, and the target data may refer to the to-be-processed data in the node device. The computer device may process the target data in response to the data processing request, to obtain the data processing result. The data processing request may be any type of data processing request, and the processing performed on the target data may be any type of processing.

503. The computer device sends the data processing result to the target node device, the target node device being configured to receive the data processing result sent by the computer device and perform a consensus procedure on the data processing result, to obtain a first consensus processing result.

The computer device may send the data processing result to the node device, so that the node device receives the data processing result sent by the computer device and performs a consensus procedure on the data processing result based on a consensus mechanism of the blockchain system, to obtain a first consensus processing result.

In the method described with respect to FIG. 5, if off-chain processing is to be performed on the target data, the node device in the blockchain system may request, through the smart contract, the computer device outside the blockchain system to process the data processing request of the target data, thereby transferring the data processing request from inside of the blockchain system to outside of the blockchain system for processing. This transfer may reduce data processing pressure of the blockchain system, and facilitate improvement in data processing efficiency. In addition, the node device may perform a consensus procedure on the data processing result obtained by performing processing by the computer device, to obtain a consensus processing result, thereby reducing the risk of error and improving the accuracy and the confidence level of data processing.

Figure 6:
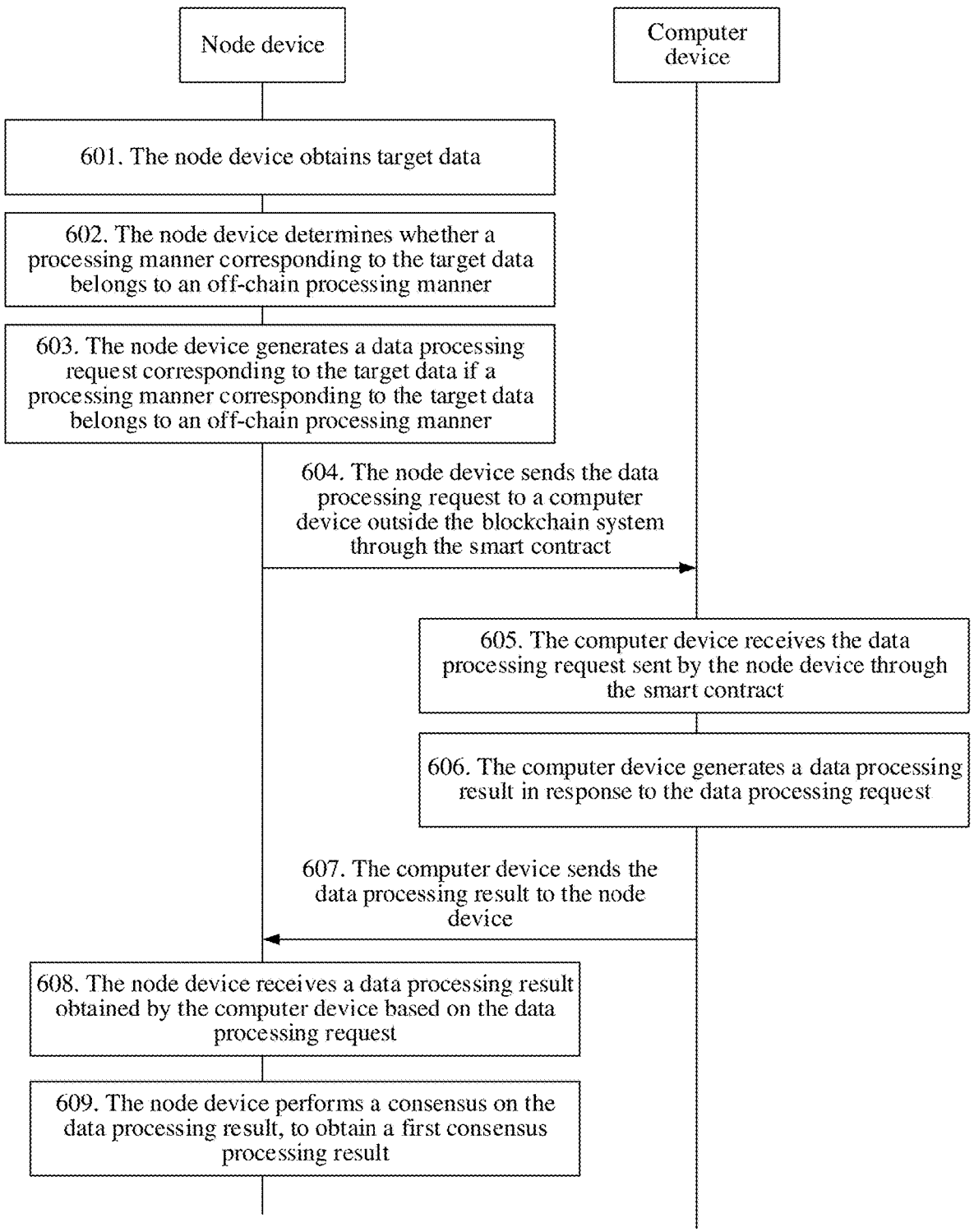
FIG. 6 is a flowchart of another data processing method according to one or more aspects described herein.

For details of a process in which the node device determines, based on the foregoing descriptions of FIG. 4 and FIG. 5, whether off-chain processing needs to be performed on the target data, refer to the following description of FIG. 6.

FIG. 6 is a flowchart of another data processing method according to one or more aspects. This method may be performed by a node device in a blockchain system and a computer device outside the blockchain system. Referring to FIG. 6, the method includes:

601. The node device obtains target data.

The target data may refer to to-be-processed data, for example, data sent by another device to the node device, or data submitted by a user of the node device, or target data generated when the smart contract performs processing according to service processing logic. The source of the target data is not limited to these examples.

The target data may be any type of data, for example, video data, voice data, picture data, text data, or table data. The type of the target data is not limited to these examples. In one example, the target data may be obtained by the node device through the smart contract.

602. The node device determines whether a processing manner corresponding to the target data belongs to an off-chain processing manner.

After obtaining the target data, the node device may determine whether a processing manner corresponding to the target data belongs to an off-chain processing manner. The processing manner corresponding to the target data may refer to a manner of processing the target data, and the off-chain processing manner may refer to a computer device outside the blockchain system performing the processing. In other words, after obtaining the to-be-processed data, the node device may determine whether a processing manner of the data belongs to an off-chain processing manner.

In one or more arrangements, if property information of the target data satisfies an intensiveness condition, the node device may determine that a processing manner corresponding to the target data belongs to an off-chain processing manner. The property information of the target data may include at least one of a computation amount, a data volume, a service party to which the target data belongs, or a data type, and the method may include the following aspects.

(1) The node device determines, if a computation amount of the target data is greater than a first threshold, that the processing manner corresponding to the target data belongs to the off-chain processing manner.

For example, the node device may determine, if a computation amount of the data is greater than a first threshold, that the processing manner of the data belongs to the off-chain processing manner.

If the computation amount of the target data is greater than the first threshold, it may indicate that intensive computation needs to be performed on the target data, and many processing resources may be consumed. To reduce data processing pressure of the blockchain system, the target data may be subjected to off-chain processing, so that the computer device outside the blockchain system assists the node device in the blockchain system in processing the target data. Therefore, it may be determined, if the computation amount of the target data is greater than the first threshold, that the processing manner of the target data belongs to the off-chain processing manner; or it may be determined, if the computation amount of the target data is not greater than the first threshold, that the processing manner of the target data does not belong to the off-chain processing manner. The intensive computation may refer to computation with a large computation amount. For example, the intensive computation may include hash computation, a signature, signature verification, and a cryptographic algorithm.

(2) The node device determines, if a data volume of the target data is greater than a second threshold, that the processing manner corresponding to the target data belongs to the off-chain processing manner.

For example, the node device may determine, if a data volume of the data is greater than a second threshold, that the processing manner of the data belongs to the off-chain processing manner.

If the data volume of the target data is greater than the second threshold, it may indicate that many processing resources are needed or consumed to process the target data. To reduce data processing pressure of the blockchain system, the target data may be subjected to off-chain processing, so that the computer device outside the blockchain system assists the node device in the blockchain system in processing the target data. Therefore, it may be determined, if the data volume of the target data is greater than the second threshold, that the processing manner of the target data belongs to the off-chain processing manner; or it may be determined, if the data volume of the target data is not greater than the second threshold, that the processing manner of the target data does not belong to the off-chain processing manner.

(3) The node device determines, if a service party to which the target data belongs is a target service party, that the processing manner corresponding to the target data belongs to the off-chain processing manner.

The target service party may also be referred to as a designated service party. For example, the node device may determine, if a service party to which the data belongs is a designated service party, that the processing manner of the data belongs to the off-chain processing manner.

In some examples, a processing manner of the data may be classified according to a service party. For example, if a service party has an off-chain processing requirement, the service party may be set as a target service party, thereby setting a processing manner of data of the service party as an off-chain processing manner. If a service party has no off-chain processing requirement, data of the service party may be subjected to on-chain processing, and the on-chain processing may be processing performed by the node device in the blockchain system. Therefore, it may be determined, if a service party to which the target data belongs is a target service party, that the processing manner of the target data belongs to the off-chain processing manner; or it may be determined, if a service party to which the target data belongs is not a target service party, that the processing manner of the target data does not belong to the off-chain processing manner.

(4) The node device determines, if a data type of the target data belongs to a preset data type, that the processing manner corresponding to the target data belongs to the off-chain processing manner.

For example, the node device may determine, if a data type of the data belongs to a preset data type, that the processing manner of the data belongs to the off-chain processing manner.

In some arrangements, a processing manner of the data may be classified according to a data type. The node device may flexibly set a first data type, data of which is subjected to off-chain processing, and a second data type, data of which is subjected to on-chain processing, and determine the first data type (which needs to be subjected to off-chain processing) as a preset data type. Therefore, it may be determined, if the data type of the target data belongs to the preset data type, that the processing manner of the target data belongs to the off-chain processing manner; or it may be determined, if the data type of the target data does not belong to the preset data type, that the processing manner of the target data does not belong to the off-chain processing manner.

In another arrangement, the node device may invoke a data prediction model, and perform prediction on the target data, to obtain a target prediction result, where the target prediction result may be configured for indicating whether the processing manner corresponding to the target data belongs to the off-chain processing manner. In other words, the node device may invoke a data prediction model, and perform prediction on the to-be-processed data, to obtain a prediction result, where the prediction result may be configured for indicating whether the processing manner of the data belongs to the off-chain processing manner.

A data prediction model may be stored in the node device. For example, the smart contract stored in the node device may include the data prediction model, and the data prediction model may be configured for predicting whether a processing manner of the data belongs to an off-chain processing manner. Therefore, the node device may input the target data to the data prediction model, and the data prediction model may perform prediction on the target data, thereby obtaining the target prediction result of the target data. In such an arrangement, predicting whether a processing manner of the target data belongs to an off-chain processing manner through the data prediction model may simplify processing logic, thereby facilitating improvement in data processing efficiency.

In one example, a training process of the data prediction model may include the following operation 6021 to operation 6023:

6021. Obtain positive sample data, a corresponding first sample label, negative sample data, and a corresponding second sample label according to a historical processing record, where the first sample label indicates that a processing manner of the positive sample data belongs to the off-chain processing manner, and the second sample label indicates that a processing manner of the negative sample data does not belong to the off-chain processing manner.

The historical processing record may be stored in the node device. The historical processing record may include processed historical data and a label corresponding to each piece of historical data, and the label corresponding to the historical data may indicate whether a processing manner of the historical data belongs to an off-chain processing manner. Therefore, according to the historical processing record, the positive sample data and the negative sample data may be obtained from the historical data, and the first sample label corresponding to the positive sample data and the second sample label corresponding to the negative sample data may be obtained. The positive sample data may be historical data indicating that a processing manner belongs to an off-chain processing manner, and the negative sample data may be historical data indicating that a processing manner does not belong to an off-chain processing manner.

6022. Invoke the data prediction model, and separately perform prediction on the positive sample data and the negative sample data, to obtain a first prediction result and a second prediction result.

The first prediction result may indicate whether a processing manner of the positive sample data predicted by the data prediction model belongs to an off-chain processing manner, and the second prediction result may indicate whether a processing manner of the negative sample data predicted by the data prediction model belongs to an off-chain processing manner.

6023. Train the data prediction model based on the first sample label, the first prediction result, the second sample label, and the second prediction result, to obtain an increased similarity between a first prediction result and the first sample label and an increased similarity between a second prediction result and the second sample label by invoking a trained data prediction model.

A higher similarity between the first prediction result and the first sample label and a higher similarity between the second prediction result and the second sample label may indicate a more accurate result predicted by the data prediction model. Therefore, the data prediction model may be trained, to obtain an increased similarity between a first prediction result and the first sample label and an increased similarity between a second prediction result and the second sample label by invoking a trained data prediction model, which can improve the prediction capability of the data prediction model. Such training may enable the data prediction model to learn how to distinguish between data on which off-chain processing needs to be performed and data on which off-chain processing does not need to be performed.

603. The node device generates a data processing request corresponding to the target data if a processing manner corresponding to the target data belongs to an off-chain processing manner.

If the processing manner corresponding to the target data belongs to an off-chain processing manner, it may indicate that the computer device needs to be requested to process the target data. Therefore, the node device may generate a data processing request corresponding to the target data, where the data processing request includes the target data, and the data processing request may be configured for requesting processing of the target data. In other words, the target data may refer to to-be-processed data, and the node device may generate a data processing request for the data if a processing manner of the data belongs to an off-chain processing manner.

In one or more arrangements, the node device may query, if a processing manner corresponding to the target data belongs to an off-chain processing manner, a target program identifier corresponding to the processing manner, where the target program identifier indicates a computation program configured for performing processing in the processing manner; and generate a data processing request based on the target data and the target program identifier.

The data processing request may include the target data and the target program identifier. For example, a processing manner corresponding to the target data may be encryption, and a target program identifier corresponding to the processing manner may indicate a computation program configured for performing encryption. For example, a processing manner corresponding to the target data may be hash computation, and a target program identifier corresponding to the processing manner may indicate a computation program configured for performing hash computation.

In other words, the node device may query, if the processing manner of the data belongs to the off-chain processing manner, the program identifier of the computation program for providing the processing manner. The program identifier may indicate a computation program configured for providing the processing manner, that is, the program identifier may indicate a computation program configured for processing the data. Then, the data processing request may be generated based on the data and the program identifier. The data processing request may include the data and the program identifier.

In such arrangements, the target program identifier may be carried in the data processing request, making it convenient for the computer device to subsequently search, according to the target program identifier, for a computation program configured for performing processing on the target data, thereby improving data processing efficiency.

In one or more aspects, the node device may implement the foregoing operation 602 and operation 603 by executing the smart contract.

604. The node device sends the data processing request to a computer device outside the blockchain system through the smart contract.

The smart contract may be provided with an interface configured for performing interaction with the computer device outside the blockchain system, and the computer device may be provided with a processing resource configured for processing the data for the smart contract.

In some examples, the data processing request may include the target data and the target program identifier, and the target program identifier may indicate a computation program configured for processing the target data. The node device may send the data processing request to the computer device through the smart contract if the target program identifier is a registered program identifier. In other words, the data processing request may include to-be-processed data and a program identifier indicating a computation program configured for processing the data. In this case, after the smart contract is executed, the data processing request may be sent to the computer device if the program identifier is registered in an execution process of the smart contract.

A program identifier corresponding to a computation program that is in the computer device and that is configured for performing processing on data in the node device may be registered in the smart contract of the node device, the registered program identifier may be stored in the smart contract. Therefore, after obtaining the data processing request, the node device first may determine, by querying contract data of the smart contract, whether the target program identifier in the data processing request is a registered program identifier; and send the data processing request to the computer device if the target program identifier is a registered program identifier, indicating that the computer device can process the data processing request, or does not need to send the data processing request to the computer device if the target program identifier is not a registered program identifier, indicating that the computer device cannot process the data processing request.

In the foregoing operation 602 to operation 604, description is made using only an example of first determining whether a processing manner belongs to an off-chain processing manner and then generating a data processing request and sending the data processing request to the computer device if the processing manner belongs to an off-chain processing manner. In another arrangement, the node device may perform processing directly according to current service processing logic. If a processing manner of the target data belongs to an off-chain processing manner, a processing function of the target data may be a request sending interface. Therefore, the node device might only need to directly invoke the request sending interface to generate a data processing request and send the data processing request to a plurality of computer devices, but might not need to determine whether a processing manner of the target data belongs to an off-chain processing manner.

605. The computer device receives the data processing request sent by the node device through the smart contract.

606. The computer device determines a data processing result in response to the data processing request.

The data processing request may include the target data. The computer device processes the target data in response to the data processing request, to obtain the data processing result. The target data may refer to to-be-processed data. Therefore, the computer device may process the data in response to the data processing request, to obtain the data processing result.

In one or more arrangements, the computer device may determine the data processing result in response to the data processing request in at least the following three manners.

(1) The computer device performs, if the data processing request is a hash computation request for the target data, hash computation on the target data in response to the data processing request, to obtain hash data.

(2) The computer device performs, if the data processing request is a verification request for the target data, verification on the target data in response to the data processing request, to obtain a verification result.

(3) The computer device performs, if the data processing request is an encryption request for the target data, encryption on the target data in response to the data processing request, to obtain encrypted data.

In addition, the data processing request can alternatively be another type of processing request, for example, a model training request or a data recovery request. The model training request may be configured for requesting to train an artificial intelligence model. The data recovery request may be configured for requesting to recover data where an error occurs.

In one or more arrangements, an external processing interface may be stored in the computer device, and the computer device may invoke the external processing interface in response to the data processing request, and perform processing on the target data, to obtain the data processing result.

The external processing interface may be provided by another device different from the computer device. The computer device may trigger, by invoking the external processing interface, a device providing the external processing interface to perform processing on the target data in the data processing request, thereby obtaining the data processing result. For example, the external processing interface may be provided by a server of a third-party data website, or the external processing interface is provided by a sensor of an Internet of Things device.

In other application scenarios, functions of the external processing interface may also be different. For example, if weather data is expected to be processed, the target data may be historical weather data, the data processing request may be a weather data prediction request based on the historical weather data, and the external processing interface may have a function of predicting future weather data based on the historical weather data.

607. The computer device sends the data processing result to the node device.

In one or more examples, the computer device may send the data processing result to the smart contract in the node device.

608. The node device receives a data processing result obtained by the computer device based on the data processing request.

In other words, the node device may receive the data processing result returned by the computer device based on the data processing request.

609. The node device performs a consensus on the data processing result, to obtain a first consensus processing result.

After obtaining the data processing result of the computer device, the node device may perform a consensus on the data processing result based on a consensus mechanism of the blockchain system, to obtain a first consensus processing result. The first consensus processing result may be used as a final processing result of the data processing request. After obtaining the first consensus processing result, the node device may continue to process the first consensus processing result according to the service processing logic in the blockchain system, for example, by adding the first consensus processing result to the blockchain in the blockchain system.

In this foregoing example, the computer device performs processing on the data processing request, and the node device performs a consensus procedure on the data processing result based on a consensus mechanism of the blockchain system, to obtain a consensus processing result, thereby reducing the erring risk and the risk of tampering with the data by the computer device, and improving the accuracy and the confidence level of data processing.

In addition, the smart contract in the node device may be provided with an interface configured for performing interaction with a computer device outside the blockchain system, that is, the smart contract can perform information exchange with the computer device in an execution process, which may be equivalent to providing a bridge for connecting the node device in the blockchain system to the computer device outside the blockchain system. Such an interface or bridge may allow data outside the blockchain system to be input to the blockchain system, thereby reducing data processing pressure and execution complexity in the blockchain system, expanding the blockchain system to some extent without adding a new node device to the blockchain system, simplifying the data processing system architecture, and extending functions of the blockchain system.

According to one or more aspects, the node device may implement the foregoing operation 608 and operation 609 by executing the smart contract.

For example, if off-chain processing needs to be performed on the target data, the node device in the blockchain system may request, through the smart contract, the computer device outside the blockchain system to process the data processing request of the target data, thereby transferring the data processing request from inside of the blockchain system to outside of the blockchain system for processing. This transfer may reduce data processing pressure of the blockchain system, and facilitate improvement in data processing efficiency. In addition, the node device may perform a consensus procedure on the data processing result obtained by performing processing by the computer device, to obtain a consensus processing result, thereby reducing the risk of errors and improving the accuracy and the confidence level of data processing.

In addition, whether off-chain processing needs to be performed on the data may be determined according to the magnitude of a computation amount or a data volume of the data, so that if the computation amount or the data volume of the data is large, the computer device outside the blockchain system may be requested to assist the node device in the blockchain system in performing processing on the data, thereby effectively reducing data processing pressure of the blockchain system.

In addition, whether off-chain processing needs to be performed on the data may be determined according to a service party to which the data belongs or a data type, and a processing manner of the data may be classified according to a service party or a data type, so that the node device may flexibly set a service party, data of which is subjected to off-chain processing, or a data type, data of which is subjected to off-chain processing, thereby improving data processing flexibility.

In addition, the predicting whether a processing manner of the target data belongs to an off-chain processing manner through the data prediction model may simplify processing logic of the smart contract, thereby facilitating improvement in data processing efficiency.

In addition, the target program identifier may be carried in the data processing request, making it convenient for the computer device to subsequently search, according to the target program identifier, for a computation program configured for performing processing on the target data, thereby improving data processing efficiency.

Figure 7:
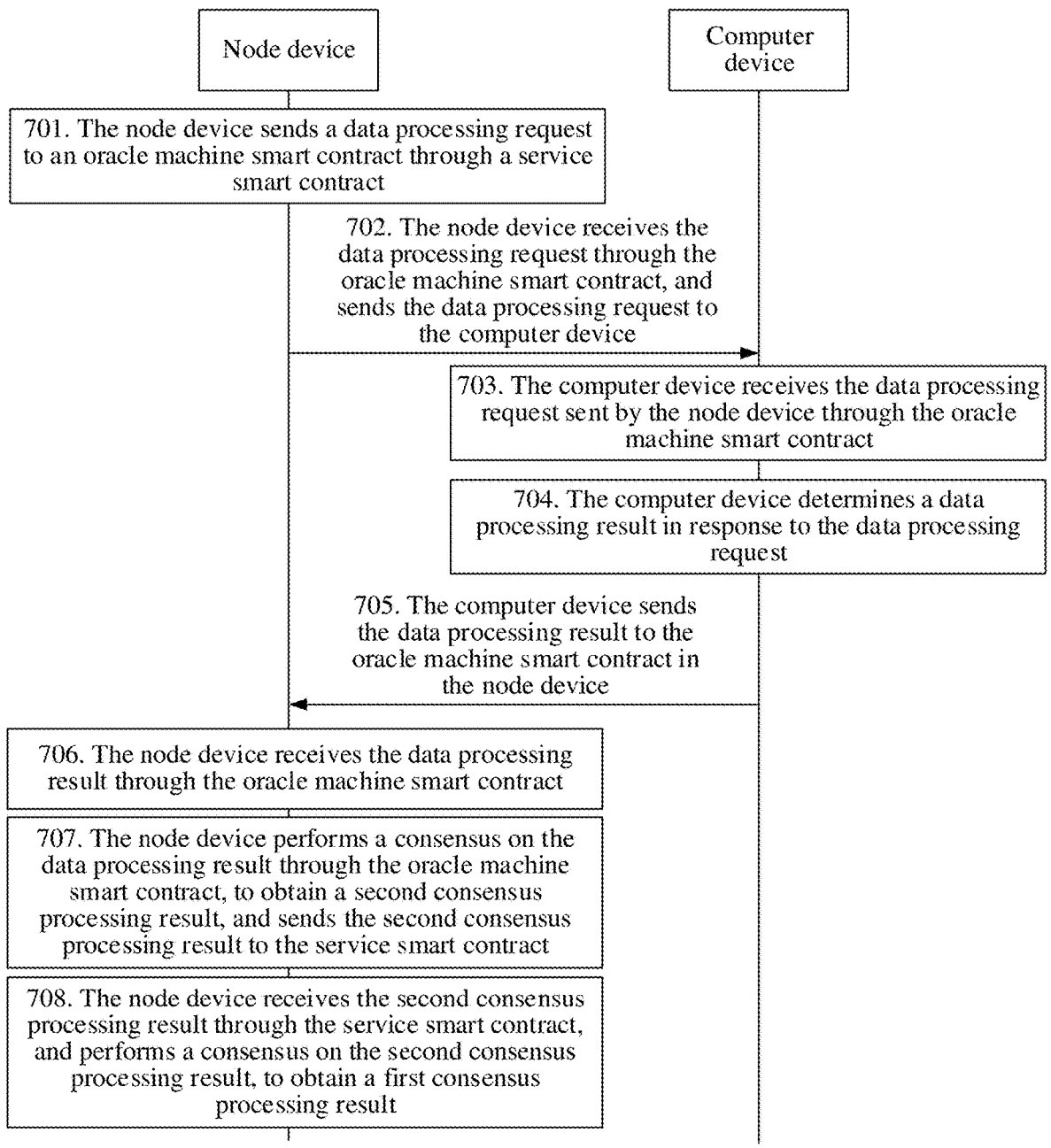
FIG. 7 is a flowchart of another data processing method according to one or more aspects described herein.

Based on the foregoing aspects, the smart contract may include a service smart contract and an oracle machine smart contract, and the node device may send the data processing request and receive the data processing result through interaction between the service smart contract and the oracle machine smart contract. FIG. 7 illustrates an example process for this interaction.

FIG. 7 is a flowchart of another data processing method that may be performed by a node device in a blockchain system and a computer device outside the blockchain system. Referring to FIG. 7, the method may include:

701. The node device sends a data processing request to an oracle machine smart contract through a service smart contract.

The service smart contract may be configured for managing data and processing logic in the blockchain system. The oracle machine smart contract may be provided with an interface configured for performing interaction with the computer device outside the blockchain system, that is, can perform information exchange with the computer device in an execution process of the oracle machine smart contract, and the computer device may be provided with a processing resource configured for processing data for the smart contract. The oracle machine smart contract may be configured for connecting the node device in the blockchain system to the computer device outside the blockchain system, and to input data outside the blockchain system to the blockchain system. Both the service smart contract and the oracle machine smart contract may be programs run in the node device.

Therefore, the node device may generate, when processing data through the service smart contract, a data processing request for the data, and may send the data processing request to the oracle machine smart contract. For example, the node device may automatically trigger execution of the service smart contract if a processing manner of the data is an off-chain processing manner, generate a data processing request for the data in an execution process of the service smart contract, and send the data processing request to the oracle machine smart contract.

A process in which the node device generates the data processing request through the service smart contract is similar to the process of the foregoing operation 601 to operation 603. Details are not described herein again.

702. The node device receives the data processing request through the oracle machine smart contract, and sends the data processing request to the computer device.

A process in which the oracle machine smart contract sends the data processing request to the computer device may include, when the service smart contract invokes the oracle machine smart contract, the oracle machine smart contract is executed, the data processing request is received in an execution process of the oracle machine smart contract, and the data processing request is sent to the computer device. The above process is similar to the process of the foregoing operation 604. Details are not described herein again.

703. The computer device receives the data processing request sent by the node device through the oracle machine smart contract.

704. The computer device determines a data processing result in response to the data processing request.

705. The computer device sends the data processing result to the oracle machine smart contract in the node device.

706. The node device receives the data processing result through the oracle machine smart contract.

707. The node device performs a consensus procedure on the data processing result through the oracle machine smart contract, to obtain a second consensus processing result, and sends the second consensus processing result to the service smart contract.

If dynamic processing logic of the oracle machine smart contract includes a consensus mechanism for the data processing result, the node device may execute the oracle machine smart contract, and perform a consensus procedure on the data processing result based on the consensus mechanism in an execution process of the oracle machine smart contract, to obtain a relatively accurate and reliable second consensus processing result. Alternatively, the node device can obtain a consensus protocol version number adopted by the blockchain system by querying configuration data of the blockchain system, determine a consensus mechanism of the blockchain system based on the consensus protocol version number obtained through query, and then perform a consensus procedure on the data processing result based on the consensus mechanism, to obtain a second consensus processing result.

708. The node device receives the second consensus processing result through the service smart contract, and performs a consensus on the second consensus processing result, to obtain a first consensus processing result.

If dynamic processing logic of the service smart contract also includes a consensus mechanism for the data processing result, the node device may execute the service smart contract, and perform a consensus procedure on the second consensus processing result based on the consensus mechanism in an execution process of the service smart contract, to obtain a more accurate and reliable first consensus processing result. Alternatively, the node device can obtain a consensus protocol version number adopted by the blockchain system by querying configuration data of the blockchain system, determine a consensus mechanism of the blockchain system based on the consensus protocol version number obtained through query, and then perform a consensus procedure on the second consensus processing result based on the consensus mechanism, to obtain a first consensus processing result.

In some examples, types of consensus mechanisms include but are not limited to: proof of work (PoW), proof of stake (PoS), delegated proof of stake (DPoS), verification pool (Verify the Pooling), and the like. Types of consensus mechanisms are not limited herein to such examples.

A process of determining the data processing result and transmitting the data processing result in the foregoing operation 703 to operation 708 is similar to the process in the foregoing operation 605 to operation 609. Details are not described herein again. A difference may be interaction between the service smart contract and the oracle machine smart contract.

In the foregoing description, the node device in the blockchain system may request, through the smart contract, the computer device outside the blockchain system to process the data processing request, thereby transferring the data processing request from inside of the blockchain system to outside of the blockchain system for processing, reducing data processing pressure of the blockchain system, and facilitating improvement in data processing efficiency. In addition, the node device may perform a consensus procedure twice on the data processing result obtained by performing processing by the computer device, to obtain a final consensus processing result, thereby reducing the risk of errors and improving the accuracy and the confidence level of data processing.

In addition, the oracle machine smart contract in the node device may provide a bridge for connecting the node device in the blockchain system to the computer device outside the blockchain system, so that data outside the blockchain system can be input to the blockchain system, thereby extending functions of the blockchain system. In addition, because data processing pressure and execution complexity in the blockchain system may be reduced, the blockchain system may be expanded to some extent.

According to some aspects described herein, the computer device outside the blockchain system may include an oracle machine control device and an oracle machine computing device, where the oracle machine control device may be configured to manage a request sent by the oracle machine smart contract, and the oracle machine computing device may be configured to process the request. For example, the oracle machine computing device may be an intensive computing device. Therefore, the data processing result may be generated and sent through interaction between the oracle machine control device and the oracle machine computing device. For a example process, reference is made to FIG. 8.

Figure 8:
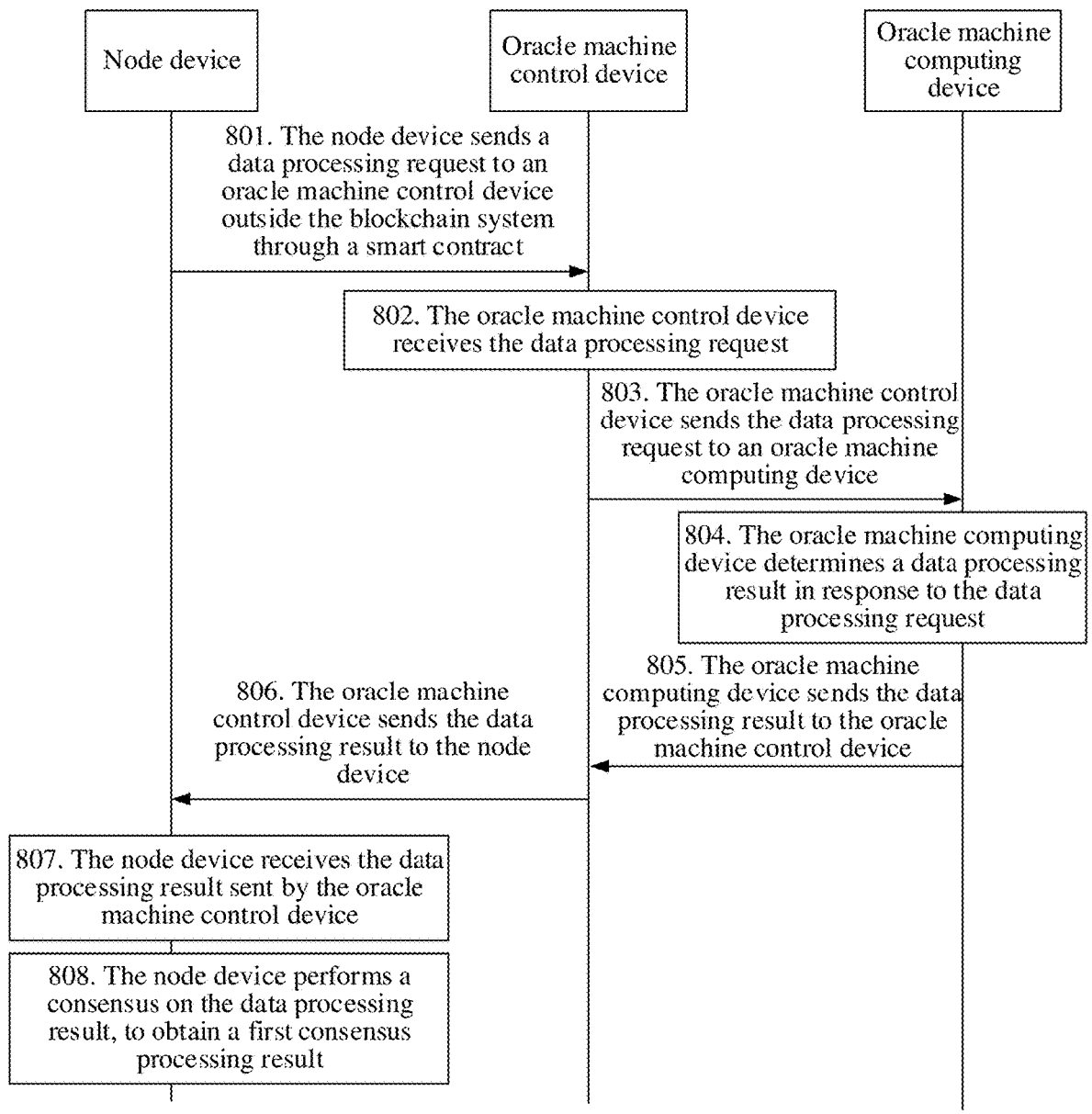
FIG. 8 is a flowchart of another data processing method according to one or more aspects described herein.

FIG. 8 is a flowchart of another data processing method that may be performed by a node device in a blockchain system and a computer device outside the blockchain system. Referring to FIG. 8, the method may include:

801. The node device sends a data processing request to an oracle machine control device outside the blockchain system through a smart contract.

In some examples, the node device may automatically trigger execution of the smart contract if it is detected that a processing manner of to-be-processed data is an off-chain processing manner, generate the data processing request in an execution process of the smart contract, and send the data processing request to the oracle machine control device.

802. The oracle machine control device receives the data processing request.

803. The oracle machine control device sends the data processing request to an oracle machine computing device.

Each oracle machine control device may be connected to at least one oracle machine computing device, and after receiving a data processing request, the oracle machine control device may send the data processing request to one of the at least one oracle machine computing device.

804. The oracle machine computing device determines a data processing result in response to the data processing request.

In one or more examples, a plurality of computation programs may be stored in the oracle machine computing device, and the data processing request may include target data and a target program identifier. The target program identifier may indicate a computation program configured for processing the target data. Therefore, the oracle machine computing device may invoke the computation program indicated by the target program identifier in response to the data processing request, and process the target data, to obtain the data processing result. In other words, a plurality of computation programs may be stored in the oracle machine computing device, the data processing request may include to-be-processed data and a program identifier, and the program identifier may indicate a computation program configured for processing the data. Therefore, the oracle machine computing device may invoke the computation program indicated by the program identifier in response to the data processing request, and process the data, to obtain the data processing result.

In addition, a process of determining the data processing result in the operation 804 is similar to the process of determining the data processing result in the foregoing operation 606. Details are not described herein again.

805. The oracle machine computing device sends the data processing result to the oracle machine control device.

806. The oracle machine control device sends the data processing result to the node device.

After receiving the data processing result sent by the oracle machine computing device, the oracle machine control device may forward the data processing result to the node device.

In one or more arrangements, the oracle machine control device may convert the data processing result into a target format, where the target format is a format supported by the smart contract, and the oracle machine control device may send the converted data processing result to the smart contract in the node device, so that the smart contract in the node device can perform processing on the data processing result in the target format. In other words, the oracle machine control device may convert the data processing result into a format supported by the smart contract, and the oracle machine control device may send the converted data processing result to the smart contract in the node device, so that the smart contract in the node device can perform processing on the data processing result in the format.

In the foregoing operation 802 to operation 806, description is made only using one oracle machine control device and one oracle machine computing device as an example. However, in other examples, the node device may send a data processing request to a plurality of oracle machine control devices, and each of the plurality of oracle machine control devices and a corresponding oracle machine computing device may perform one or more of the foregoing operation 802 to operation 806.

807. The node device receives the data processing result sent by the oracle machine control device.

808. The node device performs a consensus on the data processing result, to obtain a first consensus processing result.

In some arrangements, the node device may perform a consensus procedure on the data processing result based on a consensus mechanism of the blockchain system, to obtain a first consensus processing result.

The process of operation 807 and operation 808 is similar to the process of the foregoing operation 608 and operation 609. Details are not described herein again.

In the method discussed above, the node device in the blockchain system may request, through the smart contract, the computer device outside the blockchain system to process the data processing request, thereby transferring the data processing request from inside of the blockchain system to outside of the blockchain system for processing, reducing data processing pressure of the blockchain system, and facilitating improvement in data processing efficiency. In addition, the node device may perform a consensus procedure on the data processing result obtained by performing processing by the computer device, to obtain a consensus processing result, thereby reducing the risk of errors and improving the accuracy and the confidence level of data processing.

In the foregoing description, description is made only using an example in which the node device sends the data processing request to a computer device outside the blockchain system through the smart contract. In other examples, the node device may send a data processing request to a plurality of computer devices outside the blockchain system through the smart contract, and the plurality of computer devices may determine data processing results in response to the data processing request, and return the data processing results to the node device. The node device may receive the data processing results returned by the plurality of computer devices, and perform a consensus procedure on the received plurality of data processing results, to obtain a first consensus processing result.

Because of factors such as different processing capabilities of different computer devices, data processing results obtained by the different computer devices may be the same or different. For example, if a processing capability of a computer device is stronger or higher, a data processing result obtained by the computer device may be more accurate; or if a processing capability of a computer device is weaker or lower, a data processing result obtained by the computer device may be less accurate. In another example, if a computer device has a specific security risk, a data processing result obtained by the computer device may be at a low confidence level.

In such examples, accuracy of a consensus processing result can be improved by performing a consensus procedure on a plurality of data processing results. In addition, when the data processing results of the data processing request are indeterminate results, determinacy of the consensus processing result can be improved by performing a consensus procedure on the plurality of data processing results. For example, if the data processing request is to predict tomorrow's weather condition, a prediction result obtained by a single computer device may be indeterminate, and determinacy of the final obtained prediction result can be improved with a decentralized consensus mechanism.

In one or more arrangements, dynamic processing logic for a received data processing result can also be provided in the smart contract. For example, the following examples describe three manners in which the node device may perform a consensus on a plurality of data processing results, to obtain a first consensus processing result are pre-defined in the smart contract.

(1) A data processing result with a maximum or most number of times of occurrence among the plurality of data processing results is determined as the first consensus processing result. For example, if the data processing results are values, and the plurality of data processing results include 85, 83, 85, 89, and 87, because 85 is a data processing result with a maximum or most number of times of occurrence, 85 is determined as the first consensus processing result.

(2) A data processing result whose number of times of occurrence reaches a third threshold among the plurality of data processing results is determined as the first consensus processing result. The third threshold may be a threshold preset in the smart contract. For example, the third threshold is half or 80% of the quantity of the plurality of computer devices. Assume, for example, that the data processing results are values, the third threshold is 3, and the plurality of data processing results include 85, 83, 85, 85, and 87. Because 85 is a data processing result with the number of times of occurrence reaching 3, 85 is determined as the first consensus processing result.

(3) Weighted fusion is performed on the plurality of data processing results if the data processing results are values, to obtain the first consensus processing result. For example, the plurality of computer devices may correspond to or be assigned respective weights, and the node device performs weighted averaging on data processing results corresponding to the plurality of computer devices based on the weights corresponding to the plurality of computer devices through the smart contract, to obtain the first consensus processing result.

In one or more examples, the smart contract may include a service smart contract and an oracle machine smart contract. By executing the oracle machine smart contract, the node device may perform a consensus procedure on a plurality of data processing results based on the consensus mechanism in the execution process of the oracle machine smart contract, to obtain a second consensus processing result, and send the second consensus processing result to the service smart contract. By executing the service smart contract, the node device may receive the second consensus processing result in the execution process of the service smart contract, and perform a consensus procedure on the second consensus processing result based on the consensus mechanism, to obtain the first consensus processing result. The same consensus mechanism or different consensus mechanisms may be adopted for the foregoing two consensus procedures, which is not specifically limited herein.

According to the above, the performing a consensus procedure through the oracle machine smart contract refers to performing processing on a plurality of data processing results, for example, performing processing with the foregoing method of (1), (2), or (3), or performing statistics, screening, or fusion in another manner. In such arrangements, the performing a consensus procedure through the service smart contract may refer to performing verification and validation on the second consensus processing result.

Figure 9:
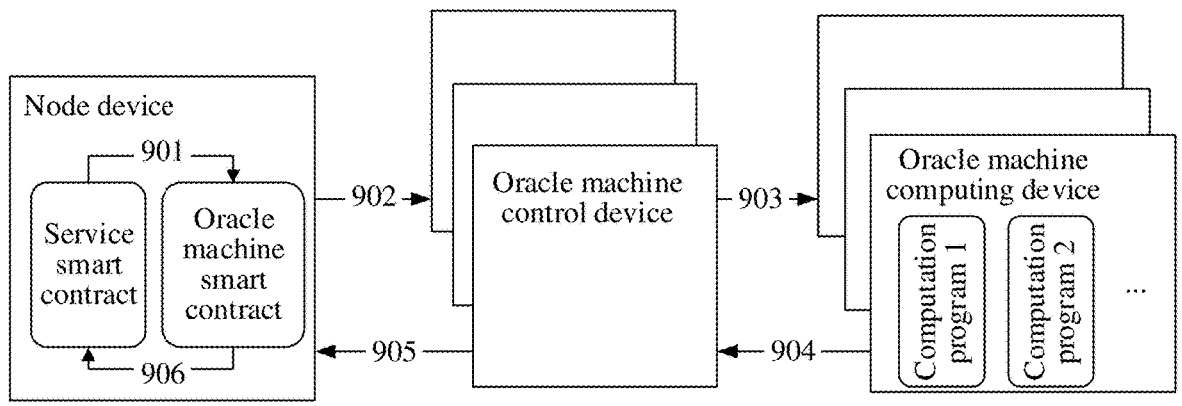
FIG. 9 is a flowchart of another data processing method according to one or more aspects described herein.

FIG. 9 is a flowchart of another data processing method. As shown in FIG. 9, the method includes the following operations.

901. A service smart contract sends a data processing request to an oracle machine smart contract.

In some arrangements, a node device may execute the service smart contract, and invoke the oracle machine smart contract in an execution process of the service smart contract, to send the data processing request to the oracle machine smart contract.

902. The oracle machine smart contract broadcasts the data processing request, where the data processing request includes to-be-processed target data and a program identifier corresponding to a computation program configured for processing the target data.

903. An oracle machine control device receives the data processing request and forwards the data processing request to an oracle machine computing device.

904. The oracle machine computing device determines a data processing result in response to the data processing request and returns the data processing result to the oracle machine control device.

905. The oracle machine control device returns the data processing result to the oracle machine smart contract.

In some examples, the node device may receive, in an execution process of the oracle machine smart contract, the data processing result returned by the oracle machine control device.

906. The oracle machine smart contract performs a consensus on a plurality of received data processing results, to obtain a second consensus processing result, and returns the second consensus processing result to the service smart contract, and the service smart contract performs a consensus on the second consensus processing result, to obtain a first consensus processing result.

In some examples, the node device may perform a consensus procedure on a plurality of received data processing results based on the consensus mechanism in the execution process of the oracle machine smart contract, to obtain the second consensus processing result, and return the second consensus processing result to the service smart contract; and perform a consensus procedure on the second consensus processing result based on the consensus mechanism in the execution process of the service smart contract, to obtain the first consensus processing result. In the foregoing manner, an example in which a consensus process requires participation of the service smart contract and the oracle machine smart contract is provided. Alternatively, a consensus process may be implemented by dynamic processing logic of the node device for a data processing result in contract data and completed with the consensus mechanism of the blockchain system, and does not require participation of the service smart contract and the oracle machine smart contract.

Figure 10:
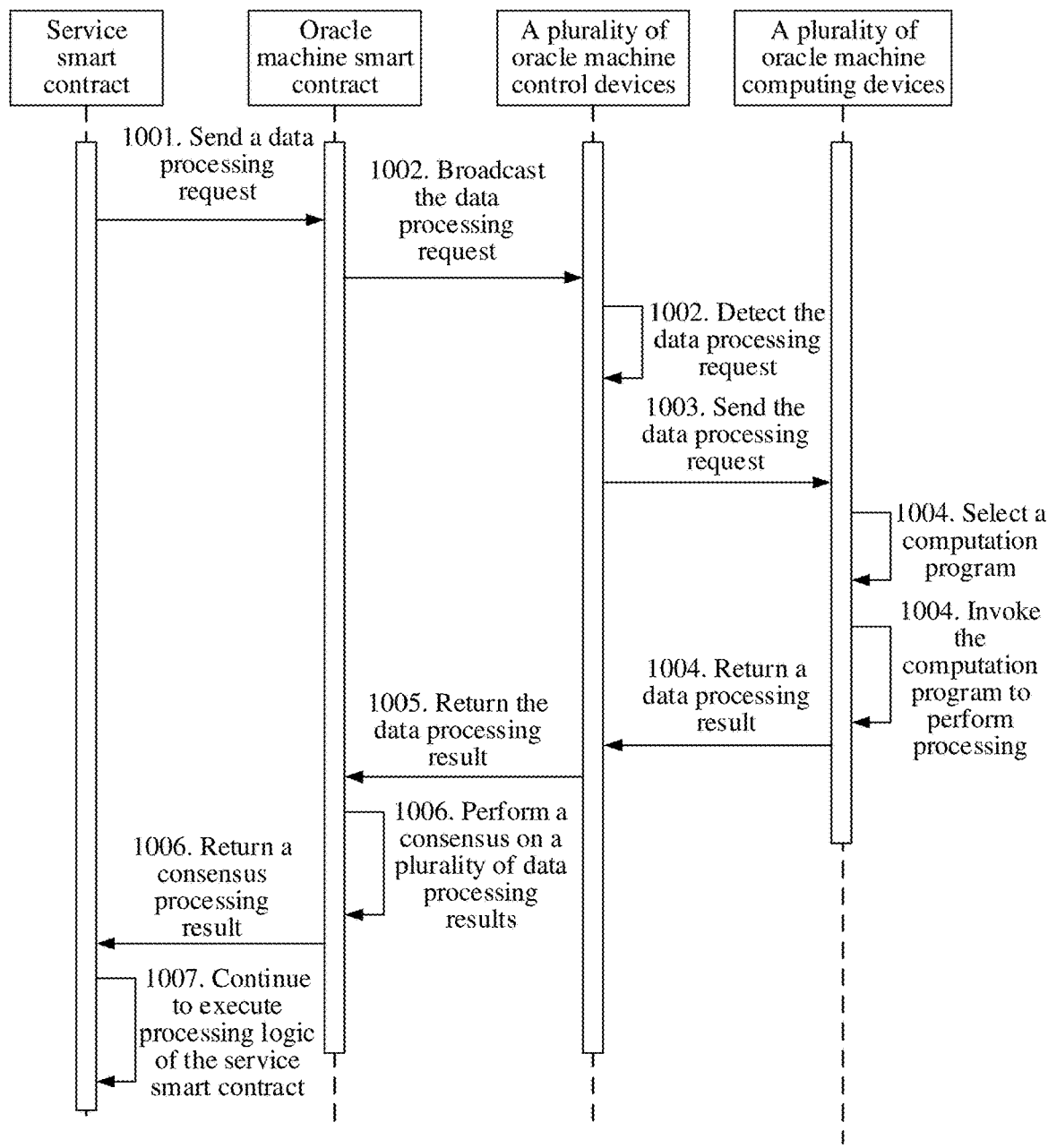
FIG. 10 is a flowchart of another data processing method according to one or more aspects described herein.

FIG. 10 is a flowchart of another data processing method. As shown in FIG. 10, the method may include the following operations.

1001. A service smart contract sends a data processing request to an oracle machine smart contract, to request the oracle machine smart contract to perform off-chain processing, where the data processing request carries to-be-processed target data and a program identifier corresponding to a computation program configured for processing the target data.

In some arrangements, a node device may execute the service smart contract, and invoke the oracle machine smart contract in an execution process of the service smart contract, to send the data processing request to the oracle machine smart contract.

1002. The oracle machine smart contract broadcasts the data processing request after being invoked, and a plurality of oracle machine control devices outside a blockchain system detect, in real time, the data processing request broadcast by the oracle machine smart contract.

In some examples, after the oracle machine smart contract is invoked, the oracle machine smart contract may be executed, and the data processing request may be broadcast in an execution process of the oracle machine smart contract.

1003. An oracle machine control device sends, after receiving the data processing request, the data processing request to an oracle machine computing device.

1004. The oracle machine computing device receives the data processing request sent by the oracle machine control device, selects a computation program indicated by a program identifier in the data processing request, invokes the computation program to perform processing on target data in the data processing request, to obtain a data processing result, and returns the data processing result to the oracle machine control device.

1005. The oracle machine control device converts, after receiving the data processing result, the data processing result into a target format supported by the oracle machine smart contract, and sends the converted data processing result to the oracle machine smart contract.

1006. The oracle machine smart contract performs a consensus on data processing results returned by the plurality of oracle machine control devices outside the blockchain system, to obtain a consensus processing result, and returns the consensus processing result to the service smart contract.

In some examples, the node device may receive, in an execution process of the oracle machine smart contract, data processing results returned by the plurality of oracle machine control devices outside the blockchain system, then perform a consensus procedure on the plurality of received data processing results based on a consensus mechanism, to obtain a consensus processing result, and return the consensus processing result to the service smart contract.

1007. The service smart contract receives the consensus processing result, and continues to execute processing logic of the service smart contract based on the consensus processing result. For example, the service smart contract may perform a consensus procedure on the received consensus processing result again, to verify accuracy and reliability of the consensus processing result. In another example, the service smart contract may add the consensus processing result to a blockchain.

In some examples, the node device may receive, in an execution process of the service smart contract, the consensus processing result sent by the oracle machine smart contract, and then perform a consensus procedure on the consensus processing result again based on the consensus mechanism, to verify accuracy and reliability of the consensus processing result; or might not need to perform a consensus procedure again, but may directly add the consensus processing result to a blockchain.

Figure 11:
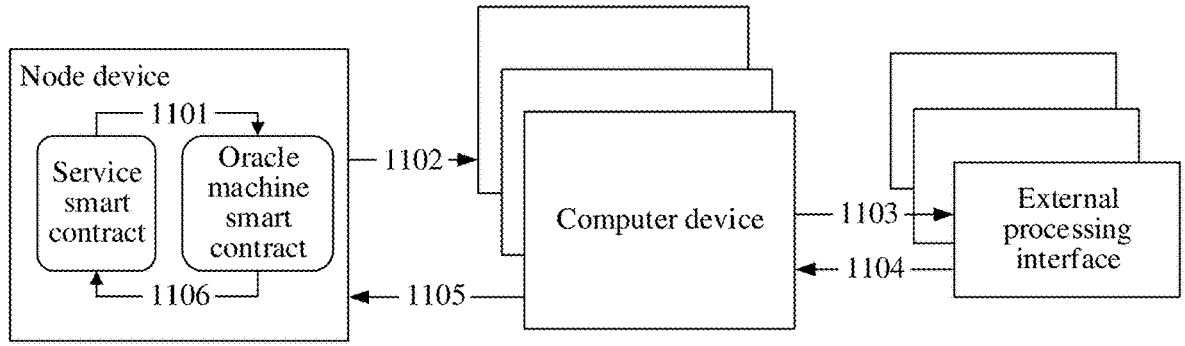
FIG. 11 is a flowchart of another data processing method according to one or more aspects described herein.

FIG. 11 is a flowchart of another data processing method. As shown in FIG. 11, the method may include the following operations.

1101. A service smart contract sends a data processing request to an oracle machine smart contract.

In some examples, a node device may execute the service smart contract, and invoke the oracle machine smart contract in an execution process of the service smart contract, to send the data processing request to the oracle machine smart contract.

1102. The oracle machine smart contract broadcasts the data processing request to a plurality of computer devices outside a blockchain system, where the data processing request includes to-be-processed target data.

In some examples, after the oracle machine smart contract is invoked, the oracle machine smart contract may be executed, and the data processing request may be broadcast in an execution process of the oracle machine smart contract.

1103. A computer device receives the data processing request and invokes an external processing interface, and the external processing interface triggers a device providing the external processing interface to perform processing on the data processing request, thereby obtaining a data processing result.

1104. The external processing interface returns the obtained data processing result to the computer device.

1105. The computer device returns the data processing result to the oracle machine smart contract.

1106. The oracle machine smart contract performs a consensus procedure on a plurality of received data processing results, to obtain a consensus processing result, and returns the consensus processing result to the service smart contract.

In some arrangements, the node device may receive, in an execution process of the oracle machine smart contract, a plurality of data processing results returned by a plurality of computer devices, then performs a consensus procedure on the plurality of received data processing results based on a consensus mechanism, to obtain a consensus processing result, and returns the consensus processing result to the service smart contract. The service smart contract may perform a consensus procedure again, or directly add the consensus processing result to a blockchain.

Figure 12:
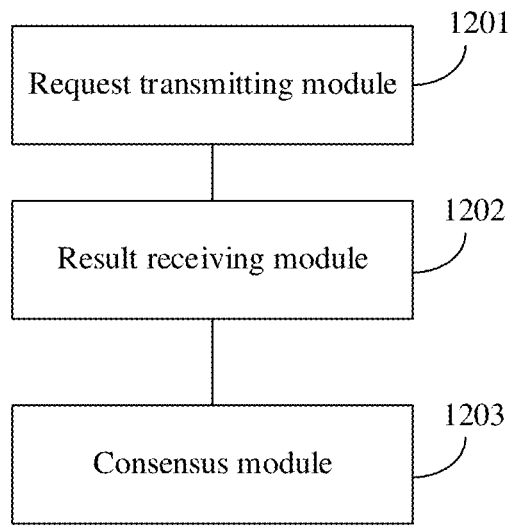
FIG. 12 is a schematic structural diagram of a data processing apparatus according to one or more aspects described herein.

FIG. 12 is a schematic structural diagram of a data processing apparatus. Referring to FIG. 12, the apparatus may be applied to any node device in a blockchain system, and a smart contract may be stored in the node device. The apparatus may include:

a request transmitting module 1201, configured to obtain to-be-processed data, and generate a data processing request for the data if a processing manner of the data belongs to an off-chain processing manner, where the off-chain processing manner may refer to a computer device outside the blockchain system performing the processing;

the request transmitting module 1201 being further configured to execute the smart contract and send the data processing request to the computer device outside the blockchain system, the smart contract being enabled to perform information exchange with the computer device outside the blockchain system in an execution process, and the computer device being provided with a processing resource configured for processing the data;

a result receiving module 1202, configured to receive a data processing result returned by the computer device based on the data processing request; and a consensus module 1203, configured to perform a consensus procedure on the data processing result based on a consensus mechanism of the blockchain system, to obtain a first consensus processing result.

In the data processing apparatus, if off-chain processing needs to be performed on the data, the node device in the blockchain system may request, through the smart contract, the computer device outside the blockchain system to process the data processing request of the data, thereby transferring the data processing request from the inside of the blockchain system to the outside of the blockchain system for processing, reducing data processing pressure of the blockchain system, and facilitating improvement in data processing efficiency. In addition, the node device may perform a consensus procedure on the data processing result obtained by performing processing by the computer device, to obtain a consensus processing result, thereby reducing the risk of errors and improving the accuracy and the confidence level of data processing.

Figure 13:
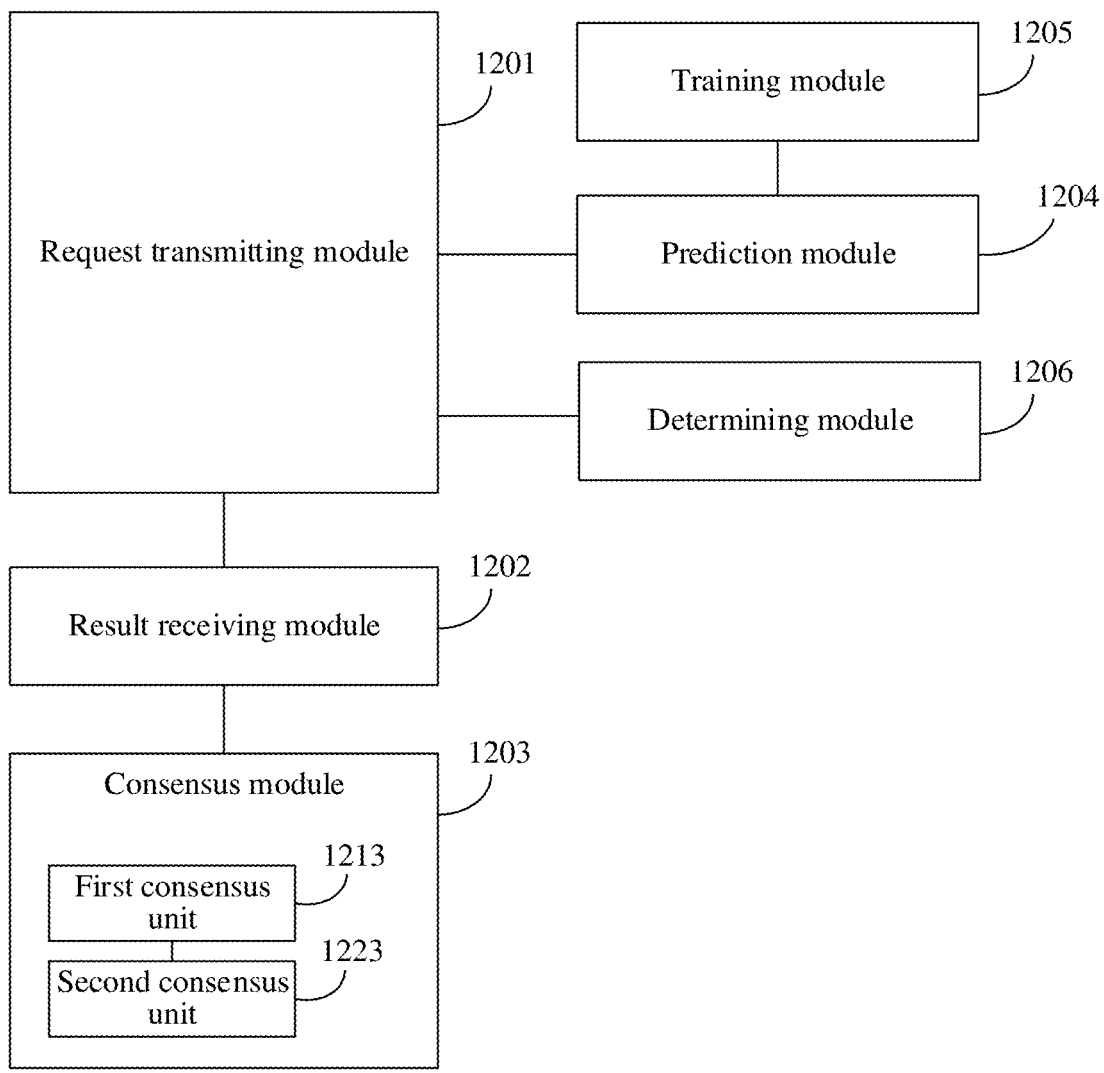
FIG. 13 is a schematic structural diagram of another data processing apparatus according to one or more aspects described herein.

In one arrangement, referring to FIG. 13, the smart contract may include a service smart contract and an oracle machine smart contract, and the oracle machine smart contract may be enabled to perform information exchange with the computer device outside the blockchain system in the execution process; and the request transmitting module 1201 may be configured to: send the data processing request to the oracle machine smart contract in an execution process of the service smart contract; and receive the data processing request in an execution process of the oracle machine smart contract, and send the data processing request to the computer device.

In one arrangement, referring to FIG. 13, the consensus module 1203 may include: a first consensus unit 1213, configured to perform a consensus procedure on the data processing result based on the consensus mechanism in the execution process of the oracle machine smart contract, to obtain a second consensus processing result, and send the second consensus processing result to the service smart contract; and a second consensus unit 1223, configured to receive the second consensus processing result in the execution process of the service smart contract, and perform a consensus procedure on the second consensus processing result based on the consensus mechanism, to obtain the first consensus processing result.

In one example, referring to FIG. 13, a plurality of computer devices outside the blockchain system may be provided, and data processing results received by the node device may be data processing results returned by the plurality of computer devices; and the consensus module 1203 may be configured to: determine a data processing result with a maximum number of times of occurrence among the plurality of data processing results as the first consensus processing result; or determine a data processing result whose number of times of occurrence reaches a third threshold among the plurality of data processing results as the first consensus processing result; or perform weighted fusion on the plurality of data processing results if the data processing results are values, to obtain the first consensus processing result.

In one arrangement, referring to FIG. 13, the apparatus may further include: a prediction module 1204, configured to invoke a data prediction model, and perform prediction on the data, to obtain a prediction result, where the prediction result may be configured for indicating whether the processing manner of the data belongs to the off-chain processing manner.

In one example, referring to FIG. 13, the apparatus may further include a training module 1205, and the training module 1205 may be configured to: obtain positive sample data, a first sample label, negative sample data, and a second sample label according to a historical processing record, where the first sample label may indicate that a processing manner of the positive sample data belongs to the off-chain processing manner, and the second sample label may indicate that a processing manner of the negative sample data does not belong to the off-chain processing manner; invoke the data prediction model, and separately perform prediction on the positive sample data and the negative sample data, to obtain a first prediction result and a second prediction result; and train the data prediction model based on the first sample label, the first prediction result, the second sample label, and the second prediction result, to obtain an increased similarity between a first prediction result and the first sample label and an increased similarity between a second prediction result and the second sample label by invoking a trained data prediction model.

In one example, referring to FIG. 13, the apparatus may further include a determining module 1206, where the determining module 1206 may be configured to: determine, if a computation amount of the data is greater than a first threshold, that the processing manner of the data belongs to the off-chain processing manner; determine, if a data volume of the data is greater than a second threshold, that the processing manner of the data belongs to the off-chain processing manner; determine, if a service party to which the data belongs is a designated service party, that the processing manner of the data belongs to the off-chain processing manner; and determine, if a data type of the data belongs to a preset data type, that the processing manner of the data belongs to the off-chain processing manner.

In one arrangement, referring to FIG. 13, the request transmitting module 1201 may be configured to: query, if the processing manner of the data belongs to the off-chain processing manner, the program identifier of the computation program for providing the processing manner, where the program identifier indicates a computation program configured for processing the data; and generate the data processing request based on the data and the program identifier.

In one arrangement, referring to FIG. 13, the data processing request may include the data and a program identifier, and the program identifier may indicate a computation program configured for processing the data; and the request transmitting module 1201 may be configured to execute the smart contract, and send the data processing request to the computer device if the program identifier is registered.

The data processing apparatus as described above is illustrated with an example division of functionality between the foregoing modules. In some examples, the functions may be allocated to and completed by different functional modules according to various needs or requirements. That is, the internal structure of the node device may be divided into different functional modules, to implement all or some of the functions described above. In addition, the data processing apparatus described above and the data processing methods may correspond to the same aspects and ideas. Example details of specific implementation processes of the data processing apparatus are provided with respect to the methods described herein. Accordingly, details are not described herein again.

Figure 14:
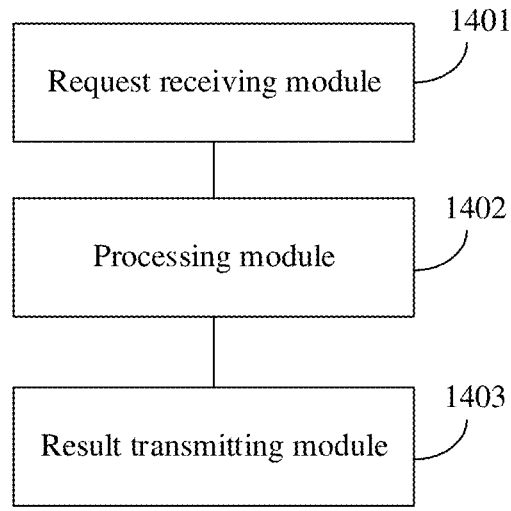
FIG. 14 is a schematic structural diagram of another data processing apparatus according to one or more aspects described herein.

FIG. 14 is a schematic structural diagram of another example data processing apparatus. Referring to FIG. 14, the apparatus may be applied to and/or operate as any computer device outside a blockchain system, and the apparatus may include:

a request receiving module 1401, configured to receive a data processing request for to-be-processed data sent by a node device in an execution process of a smart contract, the node device being located in the blockchain system, the smart contract being enabled to perform information exchange with a computer device outside the blockchain system in the execution process, the computer device being provided with a processing resource configured for processing the data, the data processing request being generated by the node device if a processing manner of the data belongs to an off-chain processing manner, and the off-chain processing manner meaning that the computer device outside the blockchain system performs processing;

a processing module 1402, configured to determine a data processing result in response to the data processing request; and a result transmitting module 1403, configured to send the data processing result to the node device, the node device being configured to receive the data processing result sent by the computer device and perform a consensus on the data processing result based on a consensus mechanism of the blockchain system, to obtain a first consensus processing result.

In the data processing apparatus, the node device in the blockchain system may request, through the smart contract, the computer device outside the blockchain system to process the data processing request, thereby transferring the data processing request from inside of the blockchain system to outside of the blockchain system for processing, reducing data processing pressure of the blockchain system, and facilitating improvement in data processing efficiency. In addition, the node device performs a consensus on the data processing result obtained by performing processing by the computer device, to obtain a consensus processing result, thereby reducing the risk of errors and improving the accuracy and the confidence level of data processing.

Figure 15:
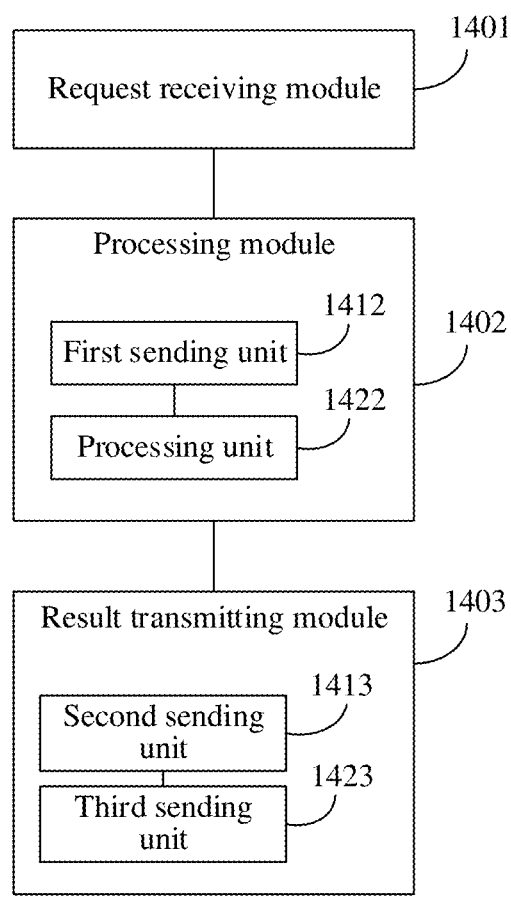
FIG. 15 is a schematic structural diagram of another data processing apparatus according to one or more aspects described herein.

In one arrangement, referring to FIG. 15, the computer device may include an oracle machine control device and an oracle machine computing device; the request receiving module 1401 in the oracle machine control device is configured to receive the data processing request. The processing module 1402 may include a first sending unit 1412 in the oracle machine control device and a processing unit 1422 in the oracle machine computing device. The first sending unit 1412 may be configured to send the data processing request to the oracle machine computing device; and the processing unit 1422 may be configured to generate the data processing result in response to the data processing request. The result transmitting module 1403 may include a second sending unit 1413 in the oracle machine computing device and a third sending unit 1423 in the oracle machine control device. The second sending unit 1413 may be configured to send the data processing result to the oracle machine control device; and the third sending unit 1423 may be configured to send the data processing result to the node device.

In one example, referring to FIG. 15, the data processing request may include the data and a program identifier, and the program identifier may indicate a computation program configured for processing the data; and the processing unit 1422 may be configured to invoke the computation program indicated by the program identifier in response to the data processing request, and process the data, to obtain the data processing result.

Additionally or alternatively, referring to FIG. 15, the third sending unit 1423 may be configured to: convert the data processing result into a target format, where the target format is a format supported by the smart contract; and send the converted data processing result to the smart contract in the node device.

In some examples, referring to FIG. 15, an external processing interface may be stored in the computer device, and the external processing interface may be provided by another device different from the computer device; and the processing module 1402 may be configured to invoke the external processing interface in response to the data processing request, and perform processing on the data, to obtain the data processing result.

In one or more arrangements, referring to FIG. 15, the processing module 1402 may be configured to: perform, if the data processing request is a hash computation request for the data, hash computation on the data in response to the data processing request, to obtain hash data; or perform, if the data processing request is a verification request for the data, verification on the data in response to the data processing request, to obtain a verification result; or perform, if the data processing request is an encryption request for the data, encryption on the data in response to the data processing request, to obtain encrypted data.

The data processing apparatus described above is illustrated with an example of division in functionality between the above-described functional modules. In some applications, the functions are allocated to and completed by different functional modules according to requirements. For example, the internal structure of the computer device may be divided into different functional modules, to implement all or some of the functions described above. In addition, the data processing apparatus described above and the data processing methods and processes described herein generally correspond to the same idea and concept. For details of an example specific implementation process of the data processing apparatus, reference may be made to the methods and processes described above. Details are not described herein again.

Aspects described herein further provides a computer device, the computer device including a processor and a memory, at least one computer program being stored in the memory, and the at least one computer program being loaded and executed by the processor, to implement operations performed in the data processing methods and processes described herein.

Figure 16:
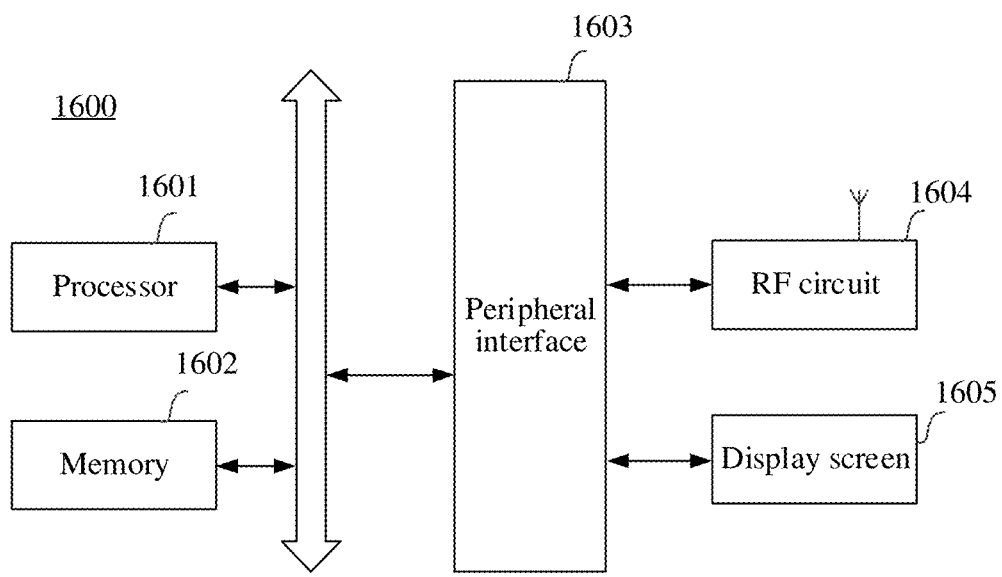
FIG. 16 is a schematic structural diagram of a terminal according to one or more aspects described herein.

In one example, the computer device may be provided as a terminal. FIG. 16 shows a schematic structural diagram of an example terminal 1600. The terminal 1600 includes: a processor 1601 and a memory 1602.

The processor 1601 may include one or more processing cores, for example, a 4-core processor or an 8-core processor. The processor 1601 may be implemented in at least one hardware form of a digital signal processor (DSP), a field-programmable gate array (FPGA), and a programmable logic array (PLA). The processor 1601 may alternatively include a main processor and a coprocessor. The main processor may be configured to process data in an active state, also referred to as a central processing unit (CPU). The coprocessor may be a low-power processor configured to process data in a standby state. In some examples, the processor 1601 may be integrated with a graphics processing unit (GPU). The GPU may be configured to render and draw content that needs to be displayed on a display screen.

The memory 1602 may include one or more computer-readable storage media. The computer-readable storage medium may be non-transient. The memory 1602 may further include a high-speed random access memory and a non-volatile memory, such as one or more magnetic disk storage devices or flash storage devices. In some examples, the non-transitory computer-readable storage medium in the memory 1602 may be configured to store at least one computer program, and the at least one computer program may be configured to be executed by the processor 1601 to implement the data processing methods and processes described herein.

In some arrangements, the terminal 1600 may include: a peripheral interface 1603 and at least one peripheral. The processor 1601, the memory 1602, and the peripheral interface 1603 may be connected through a bus or a signal cable. Each peripheral may be connected to the peripheral interface 1603 through a bus, a signal cable, or a circuit board. In one example, the peripheral may include: at least one of a radio frequency (RF) circuit 1604 or a display screen 1605.

The peripheral interface 1603 may be configured to connect the at least one peripheral related to input/output (I/O) to the processor 1601 and the memory 1602. In some examples, the processor 1601, the memory 1602 and the peripheral interface 1603 may be integrated on a same chip or circuit board. In some other examples, any one or two of the processor 1601, the memory 1602, and the peripheral interface 1603 may be implemented on a single chip or circuit board. These examples are not limiting.

The RF circuit 1604 may be configured to receive and transmit an RF signal, also referred to as an electromagnetic signal. The RF circuit 1604 may communicate with a communication network and other communication devices through the electromagnetic signal. The RF circuit 1604 may convert an electric signal into an electromagnetic signal for transmission, or converts a received electromagnetic signal into an electric signal. In one example, the RF circuit 1604 may include: an antenna system, an RF transceiver, one or more amplifiers, a tuner, an oscillator, a digital signal processor, a codec chip set, a subscriber identity module card, and the like.

The display screen 1605 may be configured to display a user interface (UI). The UI may include a graph, text, an icon, a video, and any combination thereof. When the display screen 1605 is a touch display screen, the display screen 1605 may also have a capability of acquiring a touch signal on or above a surface of the display screen 1605. The touch signal may be inputted to the processor 1601 as a control signal for processing.

The structure shown in FIG. 16 are not limiting to elements of the terminal 1600. For example, terminal 1600 may include more or fewer components than those shown in the figure, or some components may be combined, or a different component deployment may be used.

Figure 17:
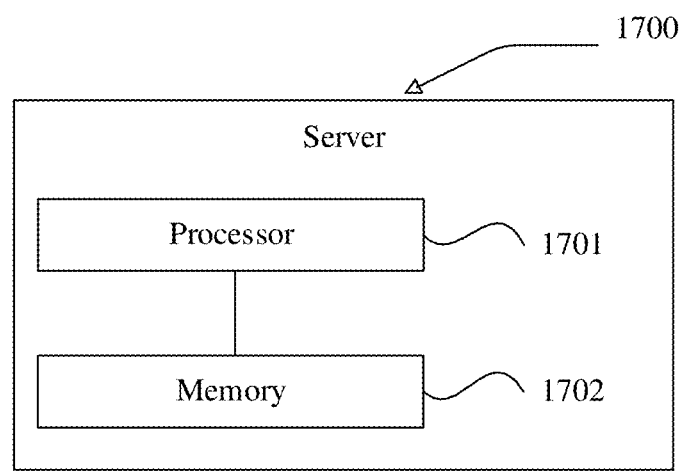
FIG. 17 is a schematic structural diagram of a server according to one or more aspects described herein.

In one or more arrangements, the computer device may be provided as a server. FIG. 17 is a schematic structural diagram of an example server. The server 1700 may vary due to different configurations or performance or requirements, and may include one or more central processing units (CPUs) 1701 and one or more memories 1702. The memory 1702 may store at least one computer program, the at least one computer program being loaded and executed by the CPU 1701 to implement the methods and processes described herein. The server may further include components such as a wired or wireless network interface, a keyboard, and an I/O interface, to facilitate I/O. The server may further include other components configured to implement a function of a device. Details are not further described herein.

One or more aspects of the disclosure further provides a computer-readable storage medium, at least one computer program being stored in the computer-readable storage medium, and the at least one computer program being loaded and executed by a processor, to implement operations performed in the data processing methods and processes described herein.

One or more aspects of the disclosure further provides a computer program product, including a computer program, the computer program being loaded and executed by a processor, to implement operations performed in the data processing method and processes described herein. In some examples, the computer program may be deployed to be executed on a computer device, or deployed to be executed on a plurality of computer devices at the same location, or deployed to be executed on a plurality of computer devices that are distributed in a plurality of locations and interconnected by using a communication network. The plurality of computer devices that are distributed in the plurality of locations and interconnected by using the communication network may form a blockchain system.

All or some of the operations may be implemented by hardware or a program instructing related hardware. The program may be stored in a computer-readable storage medium. The storage medium may be a read-only memory, a magnetic disk, or an optical disc.

The foregoing descriptions provides optional aspects, and are not intended to limit the scope of the disclosure. Any modification, equivalent replacement, or improvement made within the spirit and principle of the disclosure shall fall within the protection scope of this disclosure.

What is claimed is:

1. A data processing method, performed by a node device in a blockchain system, the node device storing a smart contract, the method comprising:
   obtaining to-be-processed data;
   determining that the to-be-processed data is to be processed in an off-chain processing manner, the off-chain processing manner meaning that a computer device outside the blockchain system performs processing, the determining including invoking a data prediction model, the data prediction model being trained by:
      obtaining positive sample data, a first sample label, negative sample data, and a second sample label according to a historical processing record, wherein the first sample label indicates that a processing manner of the positive sample data belongs to the off-chain processing manner, and the second sample label indicates that a processing manner of the negative sample data does not belong to the off-chain processing manner;
      invoking the data prediction model, and separately performing prediction on the positive sample data and the negative sample data, to obtain a first prediction result and a second prediction result; and
      training the data prediction model based on the first sample label, the first prediction result, the second sample label, and the second prediction result, to obtain an increased similarity between a first prediction result and the first sample label and an increased similarity between a second prediction result and the second sample label by invoking a trained data prediction model;
   generating a data processing request for making a prediction based on the data in response to determining that the processing manner of the data is an off-chain processing manner;
   executing the smart contract and transmitting the data processing request to the computer device, the smart contract being configured to perform information exchange with the computer device in an execution process, and the computer device being provided with a processing resource configured for processing the data, wherein the smart contract comprises a service smart contract and an oracle machine smart contract, and the oracle machine smart contract is enabled to perform information exchange with the computer device in the execution process, and wherein the executing the smart contract and transmitting the data processing request to the computer device comprises:
   transmitting the data processing request to the oracle machine smart contract in an execution process of the service smart contract; and
   receiving the data processing request in an execution process of the oracle machine smart contract, and transmitting the data processing request to the computer device;
   receiving a data processing result returned by the computer device based on the data processing request; and
   performing a consensus on the data processing result based on a consensus mechanism of the blockchain system, to obtain a first consensus processing result.

2. The method according to claim 1, wherein the performing a consensus on the data processing result based on a consensus mechanism of the blockchain system, to obtain a first consensus processing result comprises:
   performing a consensus on the data processing result based on the consensus mechanism in the execution process of the oracle machine smart contract, to obtain a second consensus processing result, and transmitting the second consensus processing result to the service smart contract; and
   receiving the second consensus processing result in the execution process of the service smart contract, and performing a consensus on the second consensus processing result based on the consensus mechanism, to obtain the first consensus processing result.

3. The method according to claim 1, wherein the method further comprises:
   performing prediction on the data based on the data prediction model, to obtain a prediction result, wherein the prediction result is configured to indicate whether the processing manner of the data belongs to the off-chain processing manner.

4. The method according to claim 1, wherein the method further comprises at least one of the following:
   determining that the processing manner of the data belongs to the off-chain processing manner upon determining that a computation amount of the data is greater than a first threshold;
   determining that the processing manner of the data belongs to the off-chain processing manner upon determining that a data volume of the data is greater than a second threshold;
   determining that the processing manner of the data belongs to the off-chain processing manner upon determining that a service party to which the data belongs is a designated service party; and
   determining that the processing manner of the data belongs to the off-chain processing manner upon determining that a data type of the data belongs to a preset data type.

5. The method according to any one of claim 1, wherein the node device receives data processing results returned by a plurality of computer devices;
   the performing a consensus on the data processing result based on a consensus mechanism of the blockchain system, to obtain a first consensus processing result comprises:
   determining a data processing result with a maximum number of times of occurrence among the plurality of data processing results as the first consensus processing result; or
   determining a data processing result whose number of times of occurrence reaches a third threshold among the plurality of data processing results as the first consensus processing result; or
   performing weighted fusion on the plurality of data processing results to obtain the first consensus processing result, the data processing results being values.

6. The method according to claim 1, wherein the data processing request comprises the data and a program identifier, and the program identifier indicates a computation program configured for processing the data; and
   the executing the smart contract and transmitting the data processing request to the computer device comprises:
   executing the smart contract, and transmitting the data processing request to the computer device after determining that the program identifier is registered.

7. The method according to claim 6, wherein the generating a data processing request for the data upon determining that a processing manner of the data belongs to an off-chain processing manner comprises:

querying the program identifier of the computation program for providing the processing manner; and
generating the data processing request based on the data and the program identifier.

8. A data processing apparatus, located in a blockchain system, the data processing apparatus comprising:
a processor; and
memory storing a smart contract and computer-readable instructions that, when executed, cause the data processing apparatus to:
obtain to-be-processed data;
determine that the to-be-processed data is to be processed in an off-chain processing manner, the off-chain processing manner meaning that a computer device outside the blockchain system performs processing, the determining including invoking a data prediction model, the data prediction model being trained by:
obtaining positive sample data, a first sample label, negative sample data, and a second sample label according to a historical processing record, wherein the first sample label indicates that a processing manner of the positive sample data belongs to the off-chain processing manner, and the second sample label indicates that a processing manner of the negative sample data does not belong to the off-chain processing manner;
invoking the data prediction model, and separately performing prediction on the positive sample data and the negative sample data, to obtain a first prediction result and a second prediction result; and
training the data prediction model based on the first sample label, the first prediction result, the second sample label, and the second prediction result, to obtain an increased similarity between a first prediction result and the first sample label and an increased similarity between a second prediction result and the second sample label by invoking a trained data prediction model;
generate a data processing request for making a prediction based on the data;
execute the smart contract and transmit the data processing request to the computer device, the smart contract being configured to perform information exchange with the computer device in an execution process, and the computer device being provided with a processing resource configured for processing the data, wherein the smart contract comprises a service smart contract and an oracle machine smart contract, and the oracle machine smart contract is enabled to perform information exchange with the computer device in the execution process, and wherein the executing the smart contract and transmitting the data processing request to the computer device comprises:
transmitting the data processing request to the oracle machine smart contract in an execution process of the service smart contract; and
receiving the data processing request in an execution process of the oracle machine smart contract, and transmitting the data processing request to the computer device;
receive a data processing result returned by the computer device based on the data processing request; and
perform a consensus on the data processing result based on a consensus mechanism of the blockchain system, to obtain a first consensus processing result.

9. The data processing apparatus according to claim 8, wherein the performing a consensus on the data processing result based on a consensus mechanism of the blockchain system, to obtain a first consensus processing result comprises:
performing a consensus on the data processing result based on the consensus mechanism in the execution process of the oracle machine smart contract, to obtain a second consensus processing result, and transmitting the second consensus processing result to the service smart contract; and
receiving the second consensus processing result in the execution process of the service smart contract, and performing a consensus on the second consensus processing result based on the consensus mechanism, to obtain the first consensus processing result.

10. The data processing apparatus according to claim 8, wherein the data processing apparatus is further caused to:
performing prediction on the data based on the data prediction model, to obtain a prediction result, wherein the prediction result is configured to indicate whether the processing manner of the data belongs to the off-chain processing manner.

11. The data processing apparatus according to claim 8, wherein the data processing apparatus is further caused to perform at least one of the following:
determine that the processing manner of the data belongs to the off-chain processing manner upon determining that a computation amount of the data is greater than a first threshold;
determine that the processing manner of the data belongs to the off-chain processing manner upon determining that a data volume of the data is greater than a second threshold;
determine that the processing manner of the data belongs to the off-chain processing manner upon determining that a service party to which the data belongs is a designated service party; and
determine that the processing manner of the data belongs to the off-chain processing manner upon determining that a data type of the data belongs to a preset data type.

12. A non-transitory computer-readable storage medium storing computer-readable instructions that, when executed by a data processing apparatus in a blockchain system and storing a smart contract, cause the data processing apparatus to:
obtain to-be-processed data;
determine that the to-be-processed data is to be processed in an off-chain processing manner, the off-chain processing manner meaning that a computer device outside the blockchain system performs processing, the determining including invoking a data prediction model, the data prediction model being trained by:
obtaining positive sample data, a first sample label, negative sample data, and a second sample label according to a historical processing record, wherein the first sample label indicates that a processing manner of the positive sample data belongs to the off-chain processing manner, and the second sample label indicates that a processing manner of the negative sample data does not belong to the off-chain processing manner;
invoking the data prediction model, and separately performing prediction on the positive sample data and the negative sample data, to obtain a first prediction result and a second prediction result; and training the data prediction model based on the first sample label, the first prediction result, the second sample label, and the second prediction result, to obtain an increased similarity between a first prediction result and the first sample label and an increased similarity between a second prediction result and the second sample label by invoking a trained data prediction model;

generate a data processing request for making a prediction based on the data;

execute the smart contract and transmit the data processing request to the computer device, the smart contract being configured to perform information exchange with the computer device in an execution process, and the computer device being provided with a processing resource configured for processing the data, wherein the smart contract comprises a service smart contract and an oracle machine smart contract, and the oracle machine smart contract is enabled to perform information exchange with the computer device in the execution process, and wherein the executing the smart contract and transmitting the data processing request to the computer device comprises:

transmitting the data processing request to the oracle machine smart contract in an execution process of the service smart contract; and receiving the data processing request in an execution process of the oracle machine smart contract, and transmitting the data processing request to the computer device;

receive a data processing result returned by the computer device based on the data processing request; and perform a consensus on the data processing result based on a consensus mechanism of the blockchain system, to obtain a first consensus processing result.

13. The non-transitory computer-readable storage medium according to claim 12, wherein the performing a consensus on the data processing result based on a consensus mechanism of the blockchain system, to obtain a first consensus processing result comprises:

performing a consensus on the data processing result based on the consensus mechanism in the execution process of the oracle machine smart contract, to obtain a second consensus processing result, and transmitting the second consensus processing result to the service smart contract; and receiving the second consensus processing result in the execution process of the service smart contract, and performing a consensus on the second consensus processing result based on the consensus mechanism, to obtain the first consensus processing result.

14. The non-transitory computer-readable storage medium according to claim 12, wherein the data processing apparatus is further caused to:

performing prediction on the data based on the data prediction model, to obtain a prediction result, wherein the prediction result is configured to indicate whether the processing manner of the data belongs to the off-chain processing manner.

* * * * *